United States Patent
Ziser et al.

(10) Patent No.: US 10,907,033 B2
(45) Date of Patent: Feb. 2, 2021

(54) PROCESSING ADDITIVE MIXTURES

(71) Applicant: LANXESS Deutschland GmbH, Cologne (DE)

(72) Inventors: Torsten Ziser, Birkenau (DE); Harald Kleinknecht, Alzey (DE); Benjamin Bechem, Mannheim (DE); Cristian Oprisoni, Oftersheim (DE); Hermann-Josef Weidenhaupt, Pulheim (DE); Ulrich Feldhues, Bergisch-Gladbach (DE); Martin Saewe, Birkenau (DE)

(73) Assignee: LANXESS Deutschland GmbH, Cologne (DE)

( * ) Notice: Subject to any disclaimer, the term of this patent is extended or adjusted under 35 U.S.C. 154(b) by 23 days.

(21) Appl. No.: 15/776,438

(22) PCT Filed: Nov. 24, 2016

(86) PCT No.: PCT/EP2016/078684
§ 371 (c)(1),
(2) Date: May 16, 2018

(87) PCT Pub. No.: WO2017/093118
PCT Pub. Date: Jun. 8, 2017

(65) Prior Publication Data
US 2019/0031863 A1    Jan. 31, 2019

(30) Foreign Application Priority Data

Dec. 3, 2015 (EP) .................................. 15197871

(51) Int. Cl.
   *C08L 9/06*    (2006.01)
   *C08L 9/00*    (2006.01)
   *C08K 3/36*    (2006.01)
   *C08K 5/17*    (2006.01)
   *C08K 5/053*    (2006.01)

(52) U.S. Cl.
CPC ...... *C08L 9/06* (2013.01); *C08K 3/36* (2013.01); *C08K 5/053* (2013.01); *C08K 5/17* (2013.01); *C08L 9/00* (2013.01)

(58) Field of Classification Search
CPC .... C08L 9/06; C08L 9/00; C08K 3/36; C08K 5/053; C08K 5/17
USPC .......................................................... 524/432
See application file for complete search history.

(56) References Cited

U.S. PATENT DOCUMENTS

| | | | |
|---|---|---|---|
| 4,281,085 | A | 7/1981 | Ikeda et al. |
| 4,717,710 | A | 1/1988 | Shimizu et al. |
| 6,355,710 | B1 | 3/2002 | Yanagisawa et al. |
| 6,753,374 | B1 | 6/2004 | Hannon et al. |
| 7,714,050 | B2 | 5/2010 | Hong |
| 9,163,132 | B2 | 10/2015 | Nagamori et al. |
| 9,260,588 | B2 | 2/2016 | Darnaud et al. |
| 9,267,014 | B2 | 2/2016 | Darnaud et al. |
| 2001/0031836 | A1 | 10/2001 | Datta et al. |
| 2006/0155077 | A1 | 7/2006 | Galimberti et al. |
| 2010/0048775 | A1 | 2/2010 | Mihara et al. |

FOREIGN PATENT DOCUMENTS

| | | | | |
|---|---|---|---|---|
| FR | 2984897 A1 | 6/2013 | | |
| GB | 191311530 A | 10/1913 | | |
| WO | WO-20130104492 A1 | * | 7/2013 | ............. C08K 5/053 |

OTHER PUBLICATIONS

WO 2013/104492 A1, machine translation, Google Patents. (Year: 2013).*
European Search Report from corresponding European Application No. 15197871, dated May 24, 2016, two pages.

* cited by examiner

*Primary Examiner* — Josephine L Chang
(74) *Attorney, Agent, or Firm* — Nicanor A. Kohncke; Christopher L. McDavid (57) ABSTRACT

The invention relates to processing additive mixtures comprising at least one polyol, amide and/or carboxylic acid, optionally auxiliaries for crystallization and at least one organic ammonium salt. Said processing additive mixtures allow the optimization of the vulcanization behavior of rubber mixtures and the properties of vulcanizates obtained by said vulcanization.

15 Claims, 3 Drawing Sheets

PROCESSING ADDITIVE MIXTURES

The processing additive mixtures according to the invention are additive packages which optimize the vulcanization behavior of rubber mixtures and the properties of vulcanizates obtained by said vulcanization.

The invention of the vulcanization of natural rubber provided a novel material with unique properties that have contributed substantially to the development of modern technology. At the beginning of the 20th century the accelerating effect of basic organic compounds was discovered.

DRP 265221 discloses that piperidine was used to accelerate vulcanization in natural rubber, and also in synthetically produced rubbers. Piperidine was toxic and volatile and had an unpleasant odour, and the rubber-processing industry therefore sought and used basic alternatives to piperidine, Other Patent publications describe by way of example aniline and other nitrogen-containing organic compounds such as hexamethylenetetramine and thiocarbanilide as accelerators.

The vulcanization of rubbers with use of sulphur-accelerator systems generally has the advantage that processing properties and product properties can be varied widely by using different accelerators and combinations of these, an example being adjustment of induction period (scorch time) and of reaction rate. "Secondary accelerators" can be added to the rubber mixtures in order to regulate induction time and vulcanization time. Among the best-known secondary accelerators are the guanidine accelerators. They are slow-acting accelerators that can be used to modify scorch time and/or full vulcanization time as required. In rubber mixtures they are used by way of example at 2 phr, based on the active ingredient.

The modulus curve of rubber mixtures using guanidines (showing the tensile-strain characteristics) rises slowly and takes a relatively long time to reach the maximum. If these accelerators are used alone they give a comparatively poor flow time/heating time ratio and lead to fairly severe reversion in the compounded rubber material; they are therefore often used in combinations with primary accelerators such as sulphenamide-based accelerators.

These slow-acting accelerators have an important function in the production of fuel-saving silica tires. They interact with the silanol groups and reduce filler interactions and viscosity. They also counteract the retarding effect of acidic liners.

One of the most important types of guanidine in the rubber industry is diphenylguanidine (DPG). DPG is widely used. The person skilled in the art is aware that DPG liberates aniline under vulcanization conditions. In the light of this, users concerned about the problems caused by aniline are seeking another secondary accelerator.

DPG-reduced mixtures are described in several publications:

US 2010/0048775, U.S. Pat. Nos. 7,605,201, 8,753,374 and 7,714,050 propose replacing the DPG in silica-based rubber mixtures entirely or to some extent with a specific amine or a thiuram disulphide.

FR 2984898 describes mixtures comprising less than 0.45 phr of DPG, and also 0.4 phr of aminoether alcohols (such as 2-(2-aminoethoxy)ethanol).

FR 2984897 describes mixtures comprising less than 0.5 phr of DPG and less than 0.45 phr of ether amines such as 3-(2-ethylhexyloxy)propylamines.

FR 2984895 describes mixtures comprising less than 0.5 phr of DPG and about 3.0 phr of alkali metal hydroxides end/or alkaline earth metal hydroxides.

In all these cited documents the use of basic compounds often reduced the scorch time but did not extend it and adversely effected the mechanical properties of the vulcanizate.

Therefore there was a strong demand to replace DPG while obtaining rubber mixtures, which are toxicologically less critical and which are able to reduce respectively the problem of aniline emission.

Hence it was an object of the present invention to provide a solution to the above problems in the form of a new processing additive mixture, which preferably was not only able to serve as a substitute for DPG in the rubber mixtures but also added effects provided by processing aids since the addition of a combined additive package generally reduces costs and improves process security compared to the addition of several separate additives. A further object of the invention would be to provide such processing additive mixture in a solid form (preferably having a melting point of more than 30° C.) of an even size such as pastilles and a process for producing such solids in an effective way. Surprisingly, it has now been found that the solution are processing additive mixtures consisting essentially of:

(A) one or more compounds selected from the group of polyols, amides and carboxylic acids, and
(B) at least one ammonium salt according to the formula (I)

$$Y\text{-}(T\text{-}X)_m\text{—}Z_w \qquad (I)$$

wherein
m=1 und w=0 or m=0 und w=1,
T is selected from a straight or branched, unsubstituted or substituted $C_2$-$C_{22}$ aliphatic moiety, unsubstituted or substituted $C_5$-$C_{22}$ aromatic moiety, unsubstituted or substituted $C_4$-$C_{22}$ alicyclic moiety; unsubstituted or substituted $C_5$-$C_{22}$ aromatic heterocyclic moiety, preferably from a $C_2$-$C_{22}$ unsubstituted or substituted aliphatic moiety,
X and Y are wherein $R^1$, $R^2$, $R^3$, $R^5$ and Z are independently of each other hydrogen or a linear or branched $C_{12}$-$C_{28}$ alkyl, preferably hydrogen, palmityl, stearyl or behenyl radical, especially preferred hydrogen and stearyl, and
$R^4$ is $C_{12}$-$C_{28}$ a linear or branched alkyl, preferably palmityl, stearyl or behenyl radical, particularly preferably stearyl,
optionally comprising one or more auxiliaries for the crystallization C) selected from the group of silica, aluminosilicates, talcum, calcium fluoride, magnesium oxide, calcium oxide, zinc oxide, pigments, zinc, calcium, magnesium, potassium, sodium or aluminum stearate, aluminum hydroxyl-bis(4-t-butylbenzoate), benzoic acid, dibenzylidene sorbitol, bis (p-methyldibenzylidene sorbitol, preferably zinc stearate and silicas,
optionally comprising one or more compounds D) selected from the group of anti-reversion agents, accelerators, activators or vulcanization agents,
and optionally comprising one or more compounds E) selected from the group of ageing protective agents, antioxidants and antidegradants, the mixture itself has a solid form, preferably having a melting point of >30° C., more preferably >50° C.

Despite not containing a basic substance, the processing additive mixtures according to the invention were found to be effective as a replacement for DPG.

Polyols (A) according to the invention are preferably glycerin, trimethylolpropane, pentaerythritol, polyether polyols, polyester polyols, including but not being limited to polycaprolactones, polycarbonate polyols and/or copolymers thereof, and their ester derivatives as well as polyols on natural base are used such as saccharose, sorbitol The polyester polyols used are preferably made out of adipic acid and butylenglycol, e.g. commercially available as Desmophen®.

Polyether polyols are preferably polyethylene glycols, polypropylene glycols, copolymers thereof, polytetramethylene glycol ethers.

All polyols used can also contain amino groups.

Polyol according to the invention means synthetic or native, renewable polyols e.g. such as branched, unbranched, saturated, unsaturated $C_2$-$C_{36}$ alkyl alcohols, diols resp. polyols, alicyclic alcohols, diols resp, polyols, aliphatic heterocyclic alcohols, diols reap. polyols, aromatic alcohols, diols resp. polyols or mixtures thereof as described in Ullmann's Encyclopedia of industrial chemistry, 5th ed., Vol. A1 VCH, Weinheim 1985 p 279 et seqq. Generally the polyols according to the invention are solid at room temperature, preferably have a melting point >30° C., more preferably >40° C., especially preferably >50° C.

Examples are neopentyl, lauryl, myristyl, cetyl, stearyl, behenyl elaidyl, or brassidyl alcohol, 1,4-cyclohexanedimethanol, neopentyl glycol, resorcinol, hydroquinone, 1,6-hexanediol, 1,8-octanediol, glycerine, trimethylol propane, pentaerythritol, polyether polyols, polyesters polyols etc., copolymers thereof, and their partial ester derivatives. in addition other polyols from natural sources can be used, e.g. saccharose, sorbitol etc.

Polyester polyols are e.g. made out of adipic acid and butylenglycol but can also be based on polycaprolactone and/or polycarbonate polyols, e.g. Desmophen C.

Polyether polyols are e.g. polyethylene glycols, polypropylene glycols, copolymers thereof, polytetramethylene glycol ethers.

All polyols can be functionalized e.g. with amino functions or be free of amino functions.

Preferred are cetyl, stearyl, behenyl alcohol, trimethylol propane, pentaerythritol, and polyethylene glycols, especially preferred is trimethylol propane and polyethylene glycols with molecular weights from 1500-25000 g/mol, most preferred with molecular weights from 4000-12500 g/mol, Carboxylic acids that can be used as component (A) of the invention are carboxylic acids, preferably synthetic or native, renewable acids e.g. such as branched, unbranched, saturated, unsaturated $C_2$-$C_{36}$ alkyl mono, di and polycarboxylic acids, $C_4$-$C_{36}$ alicyclic mono, di and polycarboxylic acids, $C_3$-$C_{36}$ aliphatic heterocyclic mono, di and polycarboxylic acids, $C_6$-$C_{36}$, aromatic mono, di and polycarboxylic acids and mixtures thereof.

Generally, the carboxylic acids are solid at room temperature, and preferably have a melting point >0° C., more preferably >40° C., most preferably >50° C.

Examples are lauric, tridecanoic, myristic, palmitic, stearic, oleic, linoleic, aracidic, behenic, erucic acids, benzoic acid, preferred are palmitic and stearic acids. Also, acids on natural base are used such as tallow acid, mixed fatty acid, palm oil acids.

Dicarboxylic acid are e.g. linear or branched, saturated or unsaturated $C_2$-$C_{28}$ dicarboxylic acid or mixtures thereof such as adipic acid, azelaic acid, sebacic acid, dodecanedicarboxylic acid, 1,4-cyclohexane dicarbocylic acid, fumaric acid, maleic acid, or aromatic dicarboxylic acid such as terephthalic, iso-phthalic and terephthalic acid, preferred is adipic acid.

Amides that can be used as component (A) are preferably amides obtainable by reacting the carboxylic acids described above with amines selected from amines and fatty amines mentioned in Ullmann's Encyclopedia of industrial chemistry, 5th ed., Vol. A2, VCH, Weinheim 1985, p 1 et sew and p 37 et sego. The amides can be linear or branched, saturated or unsaturated $C_2$-$C_{28}$ amines, cyclic or alicyclic amines such as neopentyl, lauryl, myristyl, cetyl, palmityl, stearyl, behenyl elaidyl, or brassidyl amine, preferred are stearyl or palmityl amine. Furthermore, the amides can be e.g. linear or branched, saturated or unsaturated $C_2$-$C_{28}$ diamines, cyclic or alicyclic diamines, such as ethylene diamine, propylene diamine, butylene diamine, pentamethylene diamine, hexamethylene diamine, trimethylhexamethylene diamine, isophorone diamine, aromatic diamines such as 1,3-phenylene diamine, 1,4-phenylene diamine, 4,4'-diaminodiphenylmethane etc. as well as polyamines such as linear or branched polyethylenimine, e.g. according to CAS-numbers 25987-06-8 and 9002-98-6 (homo- and copolymers) etc. can be used. A particularly preferred amide is ethylene bisstearamide.

Generally, the amides are solid at room temperature, and preferably have a melting point >30° C., more preferably >40° C., most preferably >50° C.

In a further embodiment of the invention, esters are added in addition to or as a substitute for the polyols, amides or carboxylic acids as component (A). Such esters are preferably based on branched, unbranched, saturated, unsaturated alkyl alcohols, diols resp. polyols, alicyclic alcohols, diols resp. polyols, aliphatic heterocyclic alcohols, diols reap, polyols, aromatic alcohols, diols resp. polyols or mixtures thereof such as stearyl alcohol, ethylene glycol, glycerin, trimethylolpropane, pentaerythritol, polyether polyols, polyester polyols, reacted partially or fully with branched, unbranched, saturated, unsaturated acids, diacids or polyacids, e.g. as described in Ullmann's Encyclopedia of industrial chemistry, 5th ed., Vol. A9, VCH, Weinheim 1987 p. 565et seqq.

Preferred esters are based on natural sources such as esters of glycerol with long- and medium chain fatty acids or mixtures therof, as described e.g. in Ullmann's Encyclopedia of industrial chemistry, 5th ed., Vol. A9, VCH, Weinheim 1987, p 571et sego and Vol. A10, p 175 et seqq. Examples thereof are cetyl octanoate, cetyl palmitate, stearyl stearate, i-tridecyl stearate, sorbitan stearate, stearyl phthalate, ethylene glycol mono(di)stearate, propylene glycol monostearate, tribehenin (glyceryl tribehenate), glyceryl trilaurate, glyceryl mono(di, tri)stearate, glycerides of palmitic and oleic acid, glyceryl trihydroxystearate, glyceryl stearate citrate, glyceryl stearate lactate, glyceryl mono(di, trioleate, trimethylolpropane mono, di and tristearate, pentaerythrityl tetrastearate, triacetin, polyethylene glycol monostearate, polyethylene glycol monooleate, polyethylene glycol mono (di)glyceride.

Typically, the esters are solid at room temperature, and have preferably a melting point of >30° C., more preferably >40° C., most preferably >50° C.

The processing additive mixtures according to the invention preferably comprise one or more auxiliaries for the crystallization (C).

The auxiliary for the crystallization (C) can be added in order to promote the solidification of the molten processing additive mixture during the production process, thus increasing the rate of crystallization and lowering the production time.

The auxiliary for the crystallization (C) can be selected from the nucleating agents known to the person skilled in the art, e.g. inorganic salts, organic salts, organic compounds containing at least one polar group or fine particles as silicas, aluminosilicates, talcum, zeolites etc. are used as nucleating agents. Examples for inorganic and organic salts are metal salts as calcium fluoride, magnesium oxide, calcium oxide, zinc oxide, pigments, zinc, calcium, magnesium, potassium, sodium or aluminium stearate, aluminium hydroxyl-bis(4-t-butylbenzoate), preferably zinc stearate.

(C) is preferably selected from the group of silica, aluminosilicates, talcum, calcium fluoride, magnesium oxide, calcium oxide, zinc oxide, pigments, zinc, calcium, magnesium, potassium, sodium or aluminum stearate, aluminum hydroxyl-bis(4-t-butylbenzoate), preferably zinc stearate.

Silica can be modified or not modified fumed silicas or precipitated silica.

As organic compounds benzoic acid, dibenzylidene sorbitol (DBS) or bis (p-methyldibenzylidene) sorbitol (MDBS) are preferred.

Preferably, the ammonium salt (B) according to chemical formula (I) is selected from the group of wherein r is a number from 2 to 22,
wherein $R^1$, $R^2$, $R^3$, $R^5$, and Z is independently from each other hydrogen or a linear or branched $C_{12}$-$C_{28}$ alkyl, preferably palmityl, stearyl or behenyl radical, especially preferred stearyl,
and
$R^4$ independently from each other is $C_{12}$-$C_{28}$ alkyl, preferably palmityl, stearyl or behenyl radical, especially preferred stearyl.

Stearyl ammonium stearate is preferred as the compound of formula (I).

The compounds of formula (I) are ammonium salts that can generally prepared by reaction of a carboxylic acid with an amine at temperatures of from 60° C. to 160° C., preferably from 80° C. to 150° C., most preferably from 90° C. to 140° C. After becoming clear the mixtures are stirred for further 30 min.

The following ammonium salts (AS1 to AS5) are preferred and have been prepared by the reaction of an acid and an amine hi a ratio mentioned in the following table A

TABLE A

| Acid | Amine | Ratio | ammonium salts | Melting point |
|---|---|---|---|---|
| Stearic acid | | | | 69° C. |
| | Stearyl amine[1)] | | | 51° C. |
| Stearic acid | Stearyl amine | 1:1 | Stearylammonium stearate (AS1) | 87° C. |
| Adipic acid | Stearyl amine | 1:1 | Monostearylammonium adipate (AS2) | 91° C. |
| Adipic acid | Stearyl amine | 1:2 | Bis(stearylammonium) adipate (AS3) | 99° C. |
| Adipic acid | | | | 152° C. |
| | Hexamethylene diamine | | | 41° C. |
| Stearic acid | Hexamethylene diamine | 1:1 | 1-Aminohexamethylene-6-ammonium stearate (AS4) | 79° C. |
| Stearic acid | Hexamethylene diamine | 2:1 | Hexamethylene-1,6-diammonium stearate (AS5) | 90° C. |

Diamines can be used for the synthesis of the ammonium salt e.g. linear or branched, saturated or unsaturated $C_2$-$C_{28}$ diamines such as ethylene diamine, propylene diamine, butylene diamine, pentamethylene diamine, hexamethylene diamine, 1,3,5-trimethylhexamethylene diamine, 2,2-Bis(4-aminocyclohexyl)-propane, aromatic diamines such as 1,3-phenylene diamine, 1,4-phenylene diamine, 4,4'-diaminodiphenylmethane, etc. as well as polyamines such as linear or branched polyethylenimines, e.g. according to CAS-numbers 25987-06-8 and 9002-98-6 (homo- and copolymers), diethylenetriamine etc.

Amines and fatty amines as mentioned in Ullmann's Encyclopedia of industrial chemistry, 5th ed., Vol. A2, VCH, Weinheim 1985, p 1 et seqq and p 37 et seqq can also be used for synthesis of the ammonium salts.

Carboxylic acid for the processing additive mixtures according to the invention means synthetic or native, renewable acids e.g. such as branched, unbranched, saturated, unsaturated $C_2$-$C_{36}$ alkyl acids, dicarboxylic acids rasp, polycarboxylic acids, acyclic acids, dicarboxylic acids resp. polycarboxylic acids, aliphatic heterocyclic acids, dicarboxylic acids resp. polycarboxylic acids, aromatic acids, dicarboxylic acids resp. polycarboxylic acids or mixtures thereof.

Examples are lauric, tridecanoic, myristic, palmitic, steric, oleic, linoleic, aracidic, behenic, erucic acids, benzoic acid, preferred are palmitic and stearic acids. Too, acids on natural base are used.

Dicarboxylic acid used for the processing additive mixture according to the invention are e.g. linear or branched, saturated or unsaturated C2-C28 dicarboxylic acid or mixtures thereof such as adipic acid, azelaic acid, sebacic acid, dodecanedicarboxylic acid, 1,4-cyclohexane dicarbocylic acid, fumaric acid, maleic acid, or aromatic dicarboxylic acid such as terephthalic, isophthalic and terephthalic acid, preferred is adipic acid.

Preferably, the processing additive mixture contains 35 wt.-%-99.9 wt.-% of at least one Polyol (A), 0.1 wt.-%-50 wt.-% of at least one ammonium salt (B) and 0 wt.-%-15 wt.-% of at least one auxiliary for the crystallization (C) so that the sum of the (A), (B) and (C) will acid to 100 wt %. Especially preferred are 50 wt.-% to 77 wt.-% of at least one Polyol (A), 20 wt.-% to 40 wt.-% of at least one ammonium salt (B) and 3 wt.-%-10 wt.-% of at least one auxiliary for the crystallization (C) so that the sum of the (A), ((B) and (C) will acid to 100 wt. %.

The processing additive mixture can additionally contain one or more further additives (D), which are selected from the group of anti-reversion agents, accelerators, activators or vulcanization agents. The total amount of further additives (D) is typically 0.1 wt.-% to 20 wt.-% preferably 3 wt.-% to 15 wt.-% most preferably 5 wt.-% to 10 wt.-% based on the sum of (A), (B) and (C) (with the sum of (A), (B) and (C) being 100 wt.-%). The anti-reversion agent is preferably selected from 1,6-Bis(N,N-dibenzyl thiocarbamoyl dithio)-hexane (CAS Nr.: 151900-44-6), 1,3-Bis((3-methyl-2,5-di-oxypyrrole-1-yl)methyl)benzene (CAS-Nr. 119462-56-5) or Hexamethylen-1,6-bis(thiosulfate) and their disodium salt-dihydrate.

Accelerators are preferably selected from dithiophosphates such as thiophosphate- and dithiophosphate, preferably zinc O,O-di-n-butyl dithiophosphate (ZBDP), zinc O-butyl-O-hexyl dithiophosphate, zinc O,O-diisooctyl dithiophosphate (ZOPD), dodecylammonium diisooctyl dithiophosphate (AOPD), Bis(O,O-2-ethylhexylthiophosphoryl) polysulfide (SDT) e.g. products from Rhein Chemie Rheinau GmbH. Tetrabenzylthiuram disulphide (TBzTD) or zinc dibenzyldithiocarbamate (ZBEC) can be used as accelerators, too.

The processing additive mixture can additionally contain one or more further additives (E) which are selected from anti-ageing agents, anti-oxidants and antidegradants. The total amount of further additives (E) is typically 0.05 wt.-% to 10 wt.-%, preferably 0.5 wt.-% to 8 wt.-% and most preferably 1 wt.-% to 5 wt.-% based on the sum of (A), (B) and (C).

Anti-oxidants are e.g. coloring and noncoloring antioxidants, e.g. paraphenylenediamine, isopropylphenylparaphenylenediamine (IPPD), para-phenylenediamine (6PPD), N,N-ditoly-p-phenylenediamine (DTPD), etc., amines, e.g. trimethyl-1,2-dihydroquinoline (TMQ), (phenyl)amine)-1,4-naphthalenedione (PAN), bis(4-octylphenyl)amine (ODPA), styrenated diphenylamine (SDPA), mono and bis-phenols, e.g. 2,2'-methylenebis(4-methyl-6-tert-butylphenol (BPH), 2,2'-isobutylidenebis(4,6-dimethylphenol) (NKF), 2,2'-dicyclopentadienylbis(4-methyl-6-tert-butylphenol) (SKF), 2,2'-methylenebis(4-methyl-6-cyclohexylphenol (ZKF), 2,6-di-tert-butyl-p-cresol (BHT), substituted phenol (DS), styrenated phenols (SPH), mercapzobenzimidazoles, e.g. 2-mercaotobenzimidazole (MBI), 2-mercaptomethyl-benzimidazole (MMBI) and zinc 4- and 5-methyl-2-mercaptobenzimidazole (ZMMBI).

Preferred ageing inhibitors are alkylated phenols, styrenized phenol, sterically hindered phenols such as 2,6-di-tert-butylphenol, 2,6-di-tert-butyl-p-cresol (BHT), 2,6-di-tert.-butyl-4-ethylphenol, sterically hindered phenols containing ester groups, sterically hindered phenols containing thioethers, 2,2'-methylene-bis(4-methyl-6-tert-butylphenol) (BPH) and sterically hindered thiobisphenols.

If discoloration of the rubber is not important, it is also possible to use aminic anti-aging agents, e.g. mixtures of diaryl-p-phenylenediamines (DTPD), octylated diphenylamine (ODPA), phenyl-α-naphthylamine (PAN), phenyl-β-naphthylamine (PBN), preferably ones based on phenylenediamine, e.g. N-isopropyl-N'-phenyl-p-phenylenediamine, N-1,3-dimethylbutyl-N-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD).

Other anti-aging agents are phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methyl-mercaptobenzimidazole (ZMMBI), which are usually used in combination with the above mentioned phenolic anti-aging agents. TMQ, MBI and MMBI are mainly used for NBR rubbers, where these are vulcanized peroxidically.

Antidegradants useful as component (E) are e.g. those typically employed as rubber additives and described e.g. in Manual for the rubber industry (Bayer A G). Th. Kempermann. S. Koch, J. Sumner, 2. Ed. (1993).

Surprisingly, the processing additive mixture according to the invention in combination a anti-reversion agent, such as e.g. 1,6-Bis(N,N-dibenzylthiocarbamoyldithio)hexan (CAS-Nr. 151900-44-6), lead to an extreme low Payne effect. The lower the Payne effect is the lower the dissipated energy in the material will be, and thus transferred to car tyres, the fuel consumption will be reduced. Another object of the present invention is a process for preparing a processing additive mixture, wherein at least one polyol (A), at least one ammonium salt (B) according to chemical formula (I), optionally one auxiliary for the crystallization (C) and optionally one or more further additives (D) and (E) are mixed together at temperatures between 50 up to 150° C., preferably 80 to 110° C., to a liquid mixture and the mixture is then cooled down and solidified.

Preferably, the solidification is achieved by dropping the liquid mixture onto on a cooled belt having a temperature of from −20 to 25° C., preferably 3 to 18° C.

Surprisingly, it was found that by using an auxiliary for the crystallization (C) in the above preparation process allows a solidification of the liquid mixture in typically <5 min, preferably <1 min, more preferably <30 sec, most preferably <20 sec. The solidified droplets can then be packed immediately. In a preferred embodiment, the solidified droplets are produced in less than 60 sec.

Preferably, the above preparation process yields the product in the form of a granular material, wherein the majority of granules have a size in the largest dimension of at least 1.0 mm and not more than 20 mm., preferably at least 3.0 mm and not more than 10 mm.

The processing additive mixtures according to the invention can be used in vulcanizable mixtures, containing at least one
- Rubber selected from the group of NR (natural rubber), BR (butadiene rubber) and SBR (styrene/butadiene rubber),
- at least one Silica based filler and/or carbon black and
- at least one processing additive mixture according to the invention.

Rubbers are preferably selected from the group of natural rubber (NA), as known to the skilled person in the art such as Ribbed Smoked Sheets (RSS). Technical Specified Rubber (TSR) (SMR from Malaysia, SIR from Indonesia, SLR from Sri Lanka, CSR from China), butadiene rubber (BR), such as modified and unmodified BR types, e.g. polymerized by emulsion or solution polymerization. Examples are Buna CB, Buna VSL, Buna Nd EZ from Lanxess etc. The grades can be oil extended or clear, Rubbers are also preferably selected from the group of styrene/butadiene rubber (SBR), preferably means styrene/butadiene copolymers with styrene contents from 1-60 wt.-%, preferably 20-50 wt.-%. SBR can be modified and unmodified, oil extended or clear. Examples for SBR are commercially available Buna SL, Bugle VSL, Buna BL, Buna SL, Buna FX from Lanxess Deutschland GmbH.

Examples of filers for the purposes of the invention are in particular pale-colored inorganic fillers, e.g. silica-based fillers, mica, kaolin, siliceous earth, chalk, talc powder, as well as carbon fillers, e.g. graphite, carbon nanotubes, magnetizable filers, such as carbonyl iron powder, iron oxides, ferrites, and/or fibers, e.g. aramid fiber pulp, and carbon fibers.

As silica-based fillers the following materials are preferred:

Silica, in particular precipitated silica or fumed silica, prepared, for example by precipitation from solutions of silicates or flame hydrolysis of silicon halides with specific surface areas from 5 to 1000 m$^2$/g, preferably from 20 to 400 m$^2$/g (BET surface area) and with primary particle sizes of 10-400 nm. The silicas may optionally be used as mixed oxides with other metal oxides such as Al, Mg, Ca, Ba, Zn, Zr, Ti oxides.

Synthetic silicates, such as aluminum silicate, alkaline earth silicates such as magnesium or calcium silicate, with BET surface areas of 20 to 400 m$^2$/g and primary particle size from 10 to 400 nm, Natural silicates, such as kaolin and other naturally occurring silicas, and mixtures of these substances.

The silicas and silicates mentioned here can also be used in silanized form obtainable via treatment with chlorosilanes such as monochlorosilane, dichlorosilane, trichlorosilane and tetrachlorosilane, organochlorosilanes such as methyltrichlorosilane, dimethyldichlorosilane, trimethylchlorosilane, ethyltrichlorosilane, diethyldichlorosilane, triethylchlorosilane, and also silanes containing (meth)acryloxy and/or alkoxy groups containing dairies such acryloxypropyltrimethoxysilane, (3-mercaptopropyl)trimethoxysilane, 3-glycidoxypropyl trimethoxysilane, 3-aminopropyltrimethoxysilane, mono-, di-, tri-, or tetramethoxysilane. Appropriate production processes are stated inter ale, in EP 2033990 B1.

Carbon Black:

In addition to, or as alternatives to the silica-based fillers it is possible to use carbon blacks, which are especially produced for this purpose by the lamp-black, furnace- or gas-black process and which have BET surface areas of 20 to 200 m$^2$/g as SAF, ISAF, IISAF-, HAF-, FEF- or GPF-carbon blacks.

The total content of fillers in the rubber mixture according to the invention can in principle be varied within any desired limits. Usual quantities are from 0.1 to 200 phr, preferably from 30 to 150 phr. The term phr is to be understood in the context of the present invention as parts per hundred parts by weight of rubber. In case of e.g. oil extended rubbers, the amount of oil is not included in the weight of the rubber. In a preferred embodiment, the content of carbon-black-based fillers is less than 30 wt.-% of the silica-based fillers.

These vulcanizable mixtures and vulcanizates thereof can furthermore, comprise one or more sulfur-containing silanes and/or one or more vulcanization agents. Sulfur-based or peroxidic vulcanization agents are particularly suitable for this purpose, and in particular preference is given to sulfur-based vulcanization agents.

Sulfur-containing silanes that can preferably be used for the rubber mixture and rubber vulcanizated of the invention are bis(triethoxysilylpropyl) tetrasulfane and the corresponding disulfane as well as 3-(triethoxysilyl)-1-propanethiol or silanes such as Si 363 from Evonik Industries, Germany or silane NXT or NXT Z from Momentive, where the alkoxy radical is methoxy or ethoxy, quantities used here from of 2 to 20 parts by weight, preferably 3 to 11 parts by weight, based on 100 parts by weight rubber. But also mixtures of these sulfur-containing silanes may be used, Liquid sulfur-containing silanes can have been absorbed on a carrier (dry liquid) in order to improve ease of metering and/or dispersibility (dry liquid). The active compound content is preferably from 30 and 80 parts by weight, more preferably 40 to 70 parts by weight per 100 parts by weight of dry liquid.

Preferably, the present rubber compounds comprise 50 to 120 phr of silica-based filler and from 0.2 to 12 phr of organic silanes, preferably sulfur-containing organic silanes, more preferably sulfur-containing organic silanes containing alkoxysilyl and most preferably trialkoxysilyl groups.

In a preferred embodiment of the invention, the vuicanizable mixture according to the invention can also comprise at least one vulcanization agent, preferably at least one peroxidic or sulfur based vulcanization agent, more preferably at least one vulcanization agent from the group consisting of sulfur, used in elemental soluble or insoluble form or in the form of sulfur donors. As sulfur donors, for example 4,4'-dithiodimorpholine (DTDM), 2-(4-morpholinyldithio)-benzothiazole (MBSS), caprolactam disulphide (CLD), dipentamethylene thiuram tetrasulphide (DPTT), tetramethylthiuram disulphide (TMTD) and tetrabenzylthiuram disulphide (TBzTD), most preferably TBzTD.

Particularly preferably, the rubber mixture contains 0.1-15 phr TBzTD, preferably 0.1-2 phr, more preferably 0.1 to 0.5 phr TBzTD, Peroxidic vulcanization agents used are preferably bis(2, 4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy) butane, 4,4-di-tert-butyl peroxynonyl valerate, dicumyl peroxide, 2,5-dimethyl-2,5-di(tert-butylperoxy)hexane, tert-butyl cumyl peroxide, 1,3-bis(tert-butylperoxyisopropyl) benzene, di-tert-butyl peroxide and 2,5-dimethyl-2,5-di(tert-butylperoxy)-3-hexyne.

It may be advantageous to acid further additives next to these peroxidic cross linkers especially those by which the crosslinking yield can be increased. in these cases triallyl isocyanurate, triallyl cyanurate, trimethylolpropane tri (meth)acrylate, triallyltrimellitate, ethylene glycol di(meth) acrylate, butanediol di(meth)acrylate. Trimethylolpropane (TMP), tri(meth)acrylate, zinc diacrylate, zinc dimethacrylate, 1,2-polybutadiene or N,N'-m-phenylene dimaleinimide are preferred.

In principle, the vulcanization of the vulcanizable mixture according to the invention can be carried out with sulfur or sulfur donors alone or in combination with vulcanization accelerators, such as dithiocarbamates, thiurams, thiazoles, sulfonamides, xanthogenates, bi- or polycyclic amines, dithiophosphates, caprolactams, and thiourea derivatives. Furthermore, zinc diaminodiisocyanat, hexamethylenetetramine, 1,3-bis (citraconimidomethyl) benzene and cyclic disulfanes are preferred.

Preferred vulcanizable mixtures of the invention contain sulfur-based vulcanization agents and vulcanization accelerators.

Preferably, the vulcanizable mixtures are substantially free of diphenyl guanidine which means they comprise at most 0.5 phr, preferably less than 0.4 phr, particularly preferably less than 0.2 phr, and very particularly preferably less than 0.1 phr, of diphenyl guanidine. Most preferably, the vuicanizable mixtures contain less than 1.0 phr, preferably less than 0.7 phr, particularly preferably less than 0.4 phr, and most preferably less than 0.1 phr, oaf dialkyl guanidine and diaryl guanidine in total. In a particularly preferred embodiment, the vulcanizable mixture contains less than 0.1 phr of diphenylguanidine and other guanidine derivatives, such as pentamethylenphenyl guanidine, pentabutyl-guanidine, N,N'-di-o-tolyl guanidine (DOTG), di-o-methoxydiphenyl guanidine and other diaryl guanidines, Sulfur, magnesium and/or zinc oxide are particularly preferred as the vulcanization agents, to which the known vulcanization accelerators such as mercaptobenzothiazole, thiazolsulfenamide, thiurams, thiocarbamates, xanthogenates, and thiophosphates are added.

The vulcanization agents and vulcanization accelerators are preferably used in, amounts of 0.1 to 10 phr, more preferably from 0.1 to 5 phr in the rubber composition according to the invention, The vulcanizable mixture as well as the vulcanizates thereof can also comprise other rubber auxiliaries, such as anti-ageing agents, anti-oxidants and antidegradants described above for component (E) as well as adhesive systems, heat stabilizers, light stabilizers, olefins, and paraffinic and/or aromatic plasticizers, in particular ozone protection agents, such as e.g. antiozonant waxes (e.g. Antilux etc.), special ethers or acetals with olefinic double bounds (e.g. Vulkazon), thiourea derivatives, flame retardants, such as e.g. aluminum hydroxide, phosphoric acid esters (e.g. Disflamoll) etc, processing aids, impact modifiers, plasticizers, such as e.g. long-chain esters and/or ethers, e.g. thioesters, phthalic esters, alkylsulfonic esters, adipic esters, sebacic esters, phthalic acid (poly)esters, sulphonic acid esters, dibenzyl ethers, and/or mineral oils, (paraffinic, aromatic, naphthenic or synthetic oils, e.g. Vulkanol, Mesamoll, Adimoll, Ultramoll), polymerized blend of paraffinic and aromatic hydrocarbon resins, aromatic hydrocarbon resins (Rhenosin) etc., tackifiers, such as e.g. aromatic hydrocarbon resins (e.g. Rhenosin) etc., blowing agents, e.g. azodicarbonamides such as azodicarbonamide (ADC), sulphohydrazides, such as p',p-oxybis(benzenesulfonyl-hydrazide) (OBSH), dinitrosopentamethylene tetramine (DNPT), triazole derivatives, azoisosbutyric dinitrile (and similar compounds), dyestuffs, such as e.g. organic dyestuffs, pigments, such as e.g. organic or inorganic pigments (titanium dioxide, iron oxides, chromium oxides, mixed oxides etc.), waxes, such as e.g. paraffinic waxes (e.g. Antilux), extenders, such as e.g. oil-based or filler-based extenders, organic acids, such as e.g. saturated and non-saturated acid (tallow acid, stearic acid etc.), inhibitors, metal oxides, such as e.g. zinc oxide, magnesium oxide, calcium oxide, and activators, such as triethanolamine, polyethylene glycol, hexanetriol and anti-reversion agents, such as e.g. 1,6-bis(N,N-dibenzyl thiocarbamoyl dithio)-hexane, 1,3-bis((3-methyl-2,5-dioxopyrrole-1-yl)methyl)benzene or hexamethylen-1,6-bis (thiosulfate) in particular as disodium salt-dihydrate, retarders e.g. N-nitrosodiphenylamine, N-cyclohexylthiophthalimide (CPT) (e.g. Vulkalent® G), sulfonamide derivatives (e.g. Vulkalent® E/C), phthalic anhydride (Vulkalent® B/C), benzoic anhydride.

These rubber additives are used in conventional amounts, which depend inter alia on the intended use of the vulcanizates. Conventional and preferred amounts are 0.1 to 30 phr.

Ozone resistance can be improved by antioxidants, e.g. such as N-1,3-dimethylbutyl-N'-phenyl-p-phenylenediamine (6PPD), N-1,4-dimethylpentyl-N'-phenyl-p-phenylenediamine (7PPD), N,N' bis(1,4-dimethylpentyl)-p-phenylenediamine (77PD), enol ethers or cyclic acetals.

Processing aids are intended to act between the rubber particles in order to counteract frictional forces during mixing, plastification and deformation. Vulcanizable, rubber containing mixtures according to the invention can also contain as processing aids for the processing of plastics, i.e. customary lubricants such as, for example, hydrocarbons such as oils, paraffins and PE waxes, fatty alcohols having 6 to 20 C atoms, polyols such as polyethylene, alcohols such as glycerine, trimethylol propane, glycol, pentaerythritol, ketones, carboxylic acids, such as fatty acids and montanic acids, oxidized PE waxes, metal salts of carboxylic acids, carboxylic acid amides and carboxylic acid esters, for example with the alcohols ethanol, fatty alcohols, glycerine, ethane diol, trimethylol propane, pentaerythritol, and long chain carboxylic acids as the acid component.

In order to reduce the flammability with flame retardants and the smoke generation during combustion, the vulcanizable mixture according to the invention may also contain flame retardants. For this example, antimony trioxide, phosphoric acid esters, chlorinated paraffin, aluminum hydroxide, boron compounds, zinc compounds, molybdenum trioxide, ferrocene, calcium, and magnesium carbonate can be used, too.

In a preferred embodiment of the invention the processing additive mixture according to the invention, are used in vulcanizable mixtures which comprise:
  A rubber selected from the group of NR, BR and SBR,
  A silica and/or carbon black and
  A processing additive mixture according to the invention, which can optionally comprise as well at least one peroxidic or sulfur based vulcanization agent, more preferably at least one vulcanization agent from the group consisting of sulfur, 4,4'-dithiodimorpholine (DTDM), 2-(4-morpholinyldithio)-benzothiazole (MBSS), caprolactam disulphide, dipentamethylene thiuram tetrasulphide (DPTT), tetramethylthiuram disulphide (TMTD) and tetrabenzylthiuram disulphide (TBzTD), most preferably TBzTD.

In another preferred embodiment the vulcanizable mixture comprises:
  A rubber selected from the group of NR, BR and SBR having
  50 to 120 phr Silica based filled and/or 10-110 phr carbon black and
  0.2-20 phr, preferably 1 to 6 phr, more preferably 2 to 5 phr and most preferred 3 to 4 phr of a processing additive mixture according to the invention The processing additive mixtures according to the invention typically have a melting point (to be understood as the temperature when at least 20% of the components exist in a liquid form) of at least 30° C., preferably in the range of 40 to 200° C., more preferably in the range of 60 to 150° C.

The present invention also relates to vulcanizates obtainable by vulcanization of these vulcanizable mixtures according to the invention and which preferably comprise a rubber selected from the group of NR, BR and SBR.

Another object of the present invention is a process for preparing the vulcanizable mixture, wherein the processing additive mixture is preferably added to the rubber in the first step of the mixing process with preferred mass temperature of 100 to 250° C. In another preferred embodiment processing additive mixture including the additive(s) of the formula (I) can also be added together with sulfur and/or accelerator in a later step of the mixing process at lower temperatures of 40-100° C.

In a further preferred embodiment of the invention, the processing aid and the processing additive mixture of formula (I) as well as 1,6-Bis(N,N-dibenzylthiocarbamoyldithio)hexan (CAS-Nr.: 151900-44-6) as an anti-reversion agents are added to the rubber composition in the first step of the mixing process, preferably at melt temperatures of 100-250° C. It is also possible to acid the compounds mentioned before in a following mixing step, e.g. at lower temperatures (40-100° C.) and even together with sulfur and/or accelerator.

The processing aid including promoting mixture of formula (I) and/or 1,6-Bis(N,N-dibenzylthiocarbamoyldithio) hexane (CAS-Nr.: 151900-44-6) can be used independently both in pure form and adsorbed on an inert organic or inorganic carrier, preferably a carrier selected from the group consisting of natural or synthetic silicates, especially neutral, acidic or basic silica, alumina, carbon black, zinc oxide.

The additive of the formula (I) included in the processing additive mixture can be added individually (which means separated from the processing aid) as well in form of a mixture with 1,6-Bis(N,N-dibenzylthiocarbamoyldithio) hexane (CAS-Nr.: 151900-44-6) in the mixing process.

A further object of the present invention are rubber products, preferably tyres comprising one or more of the before mentioned vulcanizates obtainable by vulcanization of the vulcanizable mixture at temperatures between 120° C. and 200° C., preferably 150° C. 170° C.

The conditions for vulcanizing are well known for a person skilled in the art and are published e.g. in manual for the rubber industry (Bayer AG). Th. Kempermann, & Koch, J. Sumner, 2. Ed. (1993).

The vulcanization of the vulcanizable mixtures according to the invention is preferably carried out at temperatures of 100-250° C., preferably 130-180° C., optionally at a pressure of 10-200 bar.

The present invention also relates to the use of the processing additive mixtures according to the invention for the production of vulcanizable rubber mixtures and vulcanizates, preferably vulcanizates that are substantially free of diphenyl guanidine.

Another object of the present invention is the use of the processing additive mixture according to the present invention for the replacement of diphenyl guanidine in rubber compounds.

The vulcanizates obtainable from the vulcanizable mixture are preferably prepared by adding at least one vulcanizing agent, such as benzothiazyl-2-tert-butylsulphene amide (TBBS) by mixing.

Typically, the shear rates in the mixture during the mixing procedure are in the range from 1 to 10000 sec-1, preferably from 1 to 1000 sec-1. At least one auxiliary including at least one processing additive mixture (I) can be added alone or together with one or more further components of the mixture in any order and also at elevated temperatures ranging from 80° C. to 200° C., preferably at a temperature of about 150° C.

The vuicanizable mixtures according to the invention are particularly suitable for the production of tire treads, subtreads, carcasses, and apex mixtures. Tires respectively tire parts here also include, for example, treads of summer tires, winter tires and all-season tires and treads of car and truck tyres.

The vulcanizates manufactured are suitable for the production of various rubber products such as preferably for the production of tire components, in particular for tire treads, subtreads, carcasses, side walls, reinforced sidewalk for run-flat tires, apex mixtures etc. as well as for the production of technical rubber products such as damping elements, roll coverings, linings of conveyor belt, belts, spinning cops, seals, golf ball cores, shoe soles, etc. The rubber products according to the invention can in particular give favorable operating characteristics to vehicles equipped with that. Therefore, such vehicles are also an object of the present invention.

Optionally, other polymers, such as polyethylene glykols (PEG) can be added to the rubber mixture prior to the vulcanization. These polymers can for example work as polymeric processing aids or impact modifier. These polymers are preferably selected from the group consisting of the homo- and copolymers based on ethylene, propylene, butadiene, styrene, vinyl acetate, vinyl chloride, glycidyl acrylate, glycidyl methacrylate, acrylates and methacrylates, whose alcohol components are branched or unbranched C1 to C10-alcohols, with polyacrylates having identical or different alcohol radicals from the group of C4 to C8 alcohols, in particular of the butanol, hexanol, octanol and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, ethylene-propylene copolymers (EPM), ethylene-propylene-diene-copolymers (EPDM) are particularly preferred.

The vulcanizates according to the invention can also be used for the production of foams. In those cases preferably chemical or physical acting blowing agents are added, such as preferably azodicarbonamide, p-toluene sulfonylhydrazide, 4,4'-oxybis(benzene-sulfohydrazide), p-toluene sulfonylsemicarbazid, 5-phenyl tetrazole, N,N'-dinitroso-pentamethylentetramine, zinc carbonate or sodium bicarbonate, and mixtures containing these substances. Carbon dioxide or halogenated hydrocarbons are also preferred as physically acting blowing agents.

The scope of the invention includes all general radical definitions, indices, parameters and illustrations mentioned above and below, and those mentioned in preferred ranges with one another, i.e. also any combinations of the respective ranges and preferred ranges.

The examples which follow serve to illustrate the invention but have no limiting effect.

EXAMPLES

Determination of the Properties of Rubber Compound or Vulcanizates

Mooney Viscosity

This property was determined by means of a viscometer in accordance with DIN 53523, part 3. The viscosity is stated together with the respective test conditions, for example, ML (1+4) 100° C. (Mooney viscosity, large rotor, preheat time and test time in minutes, test temperature). A MonTech V-MV 3000 was used for testing. The measurements were made at a rotational speed of 2 U/min at 100° C.

Scorch Performance (t5, t35)

The scorch performance was determined in accordance with DIN 53523, part 4. The selected temperature was 130° C. After passing through a minimum, as the time necessary to raise the torque value by 5/35 Mooney units relative to the minimum value was determined. A MonTech V-MV 3000 was used for testing. The measurements were made at a rotational speed of 2 U/min at 130° C.

Payne Effect

The Payne effect was determined as the difference between the moduli at a low elongation, e.g. 0.28% or 0.5% and a high elongation, e.g. 100% or 150% measured by a amplitude sweep with rubber process analyzer (RPA) equipment. A RPA 2000 from Alpha Technologies was used as RPA. The measurements were made at a deformation of 0.28% up to 150% and a frequency of 1.67 Hz at 160° C.

Curemetry

The vulcanization behavior is determined with a rotor-less vulcameter in accordance with DIN 53529, part 3. MDR 2000 P Alpha and MDR 3000 MonTech were used as tester. The measurements were made at a deformation angle of 0.5° and a frequency of 1.67 Hz. The cure temperature is 160° C. The results are presented in FIGS. 1 to 5.

Hardness Determination:

The hardness was determined in accordance with DIN 53505 by producing sheets of thickness 6 mm from the vuicanizable mixtures prepared in the following examples. Specimens of diameter 35 mm were cut out of the vulcanized sheets, and the Shore A hardness of these was determined by using a digital Shore hardness tester (Zwick GmbH & Co. KG, Ulm). The hardness of a vulcanizate provides a first indication of its stiffness.

Determination of Tensile Strength, Elongation at Break, Moduli

Tensile test was made on a S2 standard bar in accordance with DIN 53504 by means of Zwick Z010 tensile testing machine. Moduli are determined for an elongation of 100% and 300%.

Tear Strength

Tear test was executed with samples according to Graves with incision in accordance with DIN 53515 by means of Zwick Z010 tensile testing machine.

Abrasion

Abrasion was determined in accordance with DIN ISO 4649 by means of Zwick abrasion tester (Serial Number 133025).

Dynamic Mechanical Thermal Analysis

The loss factor tan δ was determined by dynamic mechanical thermal analysis (DMTA) using an Ares device (manufacturer Rheometric Scientific). The tests were carried out on test specimens measuring 30×12×2 mm$^3$ in the temperature range from −100° C.-80° C. with a heating rate of 1 K/min, a frequency of 1 Hz and a deformation of 0.1%.

Abbreviations for Materials

TABLE 1

| Trade name | Explanation | Manufacturer/Distributor |
|---|---|---|
| BUNA CB 24 | Solution high cis polybutadiene polymer (BR); not oil extended | Lanxess Deutschland GmbH |
| BUNA VSL 5025-2 HM | Solution styrene butadiene rubber (S-SBR) extended with 27.3 wt.-% TDAE (Treated Distillate Aromatic Extract) oil; 50% vinyl content, 25% styrene content | Lanxess Deutschland GmbH |
| Ultrasil GR 7000 | Silica | Evonik Industries AG |
| Si 69 | Bis[3-(triethoxysilyl)propyl]tetrasulfide | Evonik Industries AG |
| Si 75 | Bis[(triethoxysilyl)propyl]disulfide | Evonik Industries AG |
| Zinc oxide WS | Zinc oxide | Norzinco GmbH |
| Aflux ® 18 | Stearyl amine | Rheinchemie Rheinau GmbH |
| Aflux ® 37 | Mixture of surface active substances and fatty acids (Processing aid) | RheinChemie Rheinau GmBH |
| Vulkanox ® BHT | 2,6-Di-tert-butyl-p-cresol | Lanxess Deutschland GmbH |
| Vulkanox ® HS | 2,2,4-Trimethyl-1,2-dihydroquinoline, polymerized (TMQ) | Lanxess Deutschland GmbH |
| Vulkanox ® 4020 | N-(1,3-dimethylbutyl)-N'-phenyl-p-phenylene-diamine (6PPD) | Lanxess Deutschland GmbH |
| Antilux ® 654 | Blend of selected paraffins and micro-waxes | RheinChemie Rheinau GmbH |
| Vulcuren ® | 1,6-Bis(N,N'-dibenzylthiocarbamoyldithio)-hexane; oil coated powder; anti-reversion agent | Lanxess Deutschland GmbH |
| DPG | Diphenyl guanidine | MLPC International |
| VULKACIT ® NZ | N-tert-Butyl-benzothiazyl sulphenamide (TBBS); an accelerator | Lanxess Deutschland GmbH |
| E3 | 64% of a mixture containing 44.83 wt.-% TMP; 19.21 wt.-% PEG 6000, 6.4% wt.-% Auxiliary and 29.6% wt.-% AS 1 | |
| E5 | 58.25 wt.-% of a mixture containing 41.42 wt.-% TMP; 16.83 wt.-% PEG 6000, 6.5% wt.-% Auxiliary, 29% wt.-% AS 1, and 6.25 wt.-% Vulcuren ® | |
| E6 | 62% of a mixture containing 43.40 wt.-% TMP; 18.6 wt.-% PEG 6000,15% Aflux ® 18.9% Auxiliary and 14% AS1 | |
| E7 | 40 wt.-% of a mixture containing 30 wt.-% TMP; 10 wt.-% PEG 6000, 16 wt.-% stearic acid, 6.5% wt.-% Auxiliary, 30% wt.-% AS 1, and 7.5 wt-% Vulcuren ® | |
| E18 | 58.25 wt.-% of a mixture containing 41.42 wt.-% TMP; 16.83 wt.-% PEG 6000, 6.5% wt.-% Auxiliary, 29% wt.-% AS 1, and 6.25 wt. % Vulcuren ®, and wt.-% 0.3 BHT | |

TABLE 1-continued

| Trade name | Explanation | Manufacturer/Distributor |
|---|---|---|
| PEG 6000 | Polyethylene glycol with a molecular weight of 6000, CAS 25322-68-3 | BASF AG |
| Sulphur milled | | Solvay Deutschland GmbH |
| TMP | Trimethylolpropane | Lanxess Deutschland GmbH |
| AS 1 | stearylammonium stearate according to formula (I) | |
| Auxiliary | combination of zinc stearate and polydimethylsiloxane - treated fumed silica | Silica: Evonik Industries AG |
| ZBEC | zinc dibenzyldithiocarbamate (ZBEC) | Performance Additives |

Example 1: Production of Stearylammonium Stearate According to Formula (I) (AS1)

In a nitrogen atmosphere acid (stearic acid from Peter Graven GmbH & Co. KG) and stearylamine (Aflux® 18 from RheinChemie Rheinau GmbH) had been mixed together at 90° C. in the ratio 1:1 while stirring until a clear mixture was obtained. Pastilles could be produced successfully in very short times as demonstrated in example 2.

Example 2: Processing Additive Mixtures for Replacing Diphenylguanidine

The following polyols have been used:
1V=70.00 wt.-% TMP; 30.00 wt.-% PEG 6000
1E=49.00 wt.-% TMP; 21.00 wt.-% PEG 6000
2V=65.52 wt.-% TMP; 28.08 wt.-% PEG 6000
2E=51.72 wt.-% TMP; 22.17 wt.-% PEG 6000
3E=44.83 wt.-% TMP; 19.21 wt.-% PEG 6000
4E=37.00 wt.-% TMP; 15.80 wt.-% PEG 6000

The amounts of the compounds (A), (B) and (C) are stated in table 2:

Production of the Processing Additive Mixture

Polyols have been melted at 90° C. with stirring and under nitrogen. Thereupon the ammonium salt (AS1) was added and dissolved under stirring (alternatively, acid and amine are added). Then the Auxiliary and for E 4 Vulcuren® were added while stirring.

If necessary, chemicals (anti-reversion agents, accelerator, activator, vulcanization agents) were added at 80° C.-100° C. under further stirring and under nitrogen atmosphere.

The influence of the ammonium salt in the processing additive mixture according to the invention in comparison to the prior art with regard to solidification, aggregation state and other properties is summarized in table 2.

E1 shows that the addition of 30 wt.-% ammonium salt to polyols results in a shorter time of solidification.

Furthermore the comparison of V2 with E2 and E3 clearly shows that an amount of 20 wt.-% respectively 30 wt.-% AS1 also in combination with auxiliaries for crystallization give very short times of solidification, namely ~30 sec for E3. Therefore it is possible to produce pastilles of the processing additive mixture in an economic way by using polyols such as e.g. trimethylol propane (TMP), which is normally not suitable for manufacturing of pastilles in a short time.

E3 and E4, having a content of approximately 30 wt.-% AS 1, have an extremely short time for solidification of 30 seconds, so that pastilles can be produced while V2 in comparison needed more than 24 h for the solidification.

The described processing additive mixtures such as E3 and E4 are suitable for completely replacing diphenylguanidine (DPG) in rubber mixtures according to the invention, as it is demonstrated in the following examples,

Example 3: Different Types of Processing Additive Mixtures for Replacing Diphenylguanidine The following polyols have been used:
3E=44.83 wt.-% TMP; 19.21 wt.-% PEG 6000
5E=41.42 wt.-% TMP; 16.83 wt.-% PEG 6000
6E=43.40 wt.-% TMP; 18.60 wt.-% PEG 6000
7E=30.00 wt.-% TMP; 10.00 wt.-% PEG 6000

The amounts of the compounds used and the characteristics of the mixtures are summarized in table 3:

The mixtures have been prepared analogous to example 2 by using the compound and amounts as mentioned in table 3:

The influence of the ammonium salt in the processing additive mixture according to the invention in comparison to

TABLE 2

| No. | Polyol | Auxiliary | AS 1 [%] | Vulcuren ® | Melting point | physical state | Solidification in | Remark |
|---|---|---|---|---|---|---|---|---|
| V1 | 100% 1V | — | — | — | ~60° C. | Liquid | >24 h | — |
| E1 | 70% 1E | — | 30 | — | ≥60° C. | Solid | <24 h | Tacky, rubber-like pastilles |
| V2 | 93.6 2V | 6.4% | — | — | ~60° C. | Liquid | >2 h | — |
| E2 | 73.9% 2E | 6.4% | 19.7 | — | ≥60° C. | Solid | <30 min | Tacky, soft pastilles |
| E3 | 64.0% 3E | 6.4% | 29.6 | — | ≥60° C. | Solid | ~30 sec | Not tacky, hard pastilles |
| E4 | 52.8% 4E | 6.5% | 30 | 10.7% | ≥60° C. | solid | ~30 sec | Not tacky, soft pastilles | the prior art with regard to solidification, aggregation state and other properties is summarized in table 3.

The mixtures can be neutrally (3E, 5E), basic (6E) or acidic (7E).

TABLE 3

| | Polyol | Stearic acid | Aflux 18 | Auxiliary | AS1 | Vulcuren ® | physical state | Solidification time | Remark |
|---|---|---|---|---|---|---|---|---|---|
| E3 | 64.0% 3E | 0% | 0% | 6.4% | 29.6% | 0% | Solid | ~30 sec | not tacky, hard pastilles |
| E5 | 58.25% 5E | 0% | 0% | 6.5% | 29% | 6.25% | Solid | ~35 sec | soft pastilles |
| E6 | 62% 6E | 0% | 15% | 9% | 14% | 0% | Solid | ~30 sec | soft pastilles |
| E7 | 40.0% 7E | 16.0% | 0% | 6.5% | 30.0% | 7.5% | Solid | ~40 sec | soft pastilles |

1) n.d. = not determined

The mixtures E5 and E7 have scarcely an interaction with the additive D, here Vulcuren®, during the preparation of the processing additive mixture (E5, E7). The interaction can be minimized by reducing the mixing temperature to approximately 80° C.-90° C. or lower.

The caustic E8 has also like E3 a sufficient short time for solidification in order to produce pastilles economically.

Therefore it is surprisingly possible to produce pastilles of the processing additive mixture in an economic way, containing polyols, which are deemed being not suitable for manufacturing of pastilles in a sufficient short time, e.g. trimethylol propane (TMP).

These processing additive mixtures are surprisingly able to replace completely DPG in rubber compounds as outlined later, Example 4: Vulcanizable Mixtures and a Method for Producing Those The following components were used:
The vulcanizable mixtures comprise processing additive mixtures for replacing completely diphenylguanidine.

TABLE 4

| Vulcanizable mixtures | | | |
|---|---|---|---|
| | V3 | E8 | V4 |
| BUNA CB 24 | 25 | 25 | 25 |
| BUNA VSL 5025-2 | 103.1 | 103.1 | 103.1 |
| Si 75 | 5.85 | 5.85 | 5.85 |
| Ultrasil GR 7000 | 80 | 80 | 80 |
| Zinc oxide WS | 2.5 | 2.5 | 2.5 |
| Stearic acid | 1.0 | 1.0 | 1.0 |
| AFLUX ® 37 | | | 3.0 |
| E3 | | 6.0 | |
| Vulkanox ® HS | 1.0 | 1.0 | 1.0 |
| Vulkanox ® 4020 | 1.0 | 1.0 | 1.0 |
| Antilux ® 654 | 1.0 | 1.0 | 1.0 |
| DPG | 2.0 | | 2.0 |
| TBBS | 1.7 | 1.7 | 1.7 |
| Sulphur milled | 1.4 | 1.4 | 1.4 |

Amounts in phr (parts by weight per 100 parts of rubber)

Production of Vulcanizates

The vulcanizates E8 and V3 to V4 have been prepared as follows:

Mixing Step 1:

The Polymers Buna CB 24 and Buna VSL 5025-2 have been filled into an internal mixer (Filling degree: 72%; rotational speed: 70 rpm; 70° C.) and mixed for about 30 seconds. Further components, such as the Antidegradants I and II, ½ portion of silica Ultrasil GR 7000 and ½ silane Si 75 were added and mixed for about 90 seconds, followed by the addition of ½ Ultrasil GR 7000 and ½ silane Si 75 and further mixing for about 60 seconds.

The expulsion took place at 150° C.-160° C.

The compound was put on a roller with a nip of 4 mm at 50° C. for approximately 45 sec. The compound was cut and was transformed to a rolled sheet; the rolled sheet was put again on the roller immediately. The procedure was repeated altogether six times, whereat the compound was cut three times from the right side and three times from the left side in order to get a homogeneous compound. The sheets were stored for 24 hours at room temperature, Mixing Step 2:

In the second mixing stage the batch of first step, ZnO WS, processing additive mixtures E3, Aflux® 37, Antilux® 654 have been filled into an internal mixer (Filling degree: 69%; rotational speed: 70 rpm; 90° C.) and mixed for about 60 seconds. Then the compound was mixed for about 120 seconds. The expulsion took place at 150° C.-160° C. The compound was put on a roller with a nip of 4 mm for approximately 45 sec. The compound was cut and was transformed to a rolled; the rolled sheet was put again on the roller immediately The procedure was repeated altogether six times, whereat the compound was cut three times from the right side and three times from the left side in order to get an homogeneous compound. The sheets were stored for 24 hours at room temperature.

Mixing Step 3:

In the third mixing stage the batch of second step has been filled into an internal mixer (Filling degree: 67%; rotational speed: 40 rpm; 50° C.) and mixed for about 80 seconds. Further additives, such as Sulphur, accelerators DPG, TBBS were added and mixed for about 90 seconds. The expulsion took place at 90° C.-110° C. The compound was put on a roller with a nip of 3-4 mm for approximately 20 sec. The compound was cut and was transformed to a rolled sheet; the rolled sheet was put again on the roller immediately. The procedure was repeated altogether six times, whereat the compound was cut three times from the right side and three times from the left side in order to get a homogeneous compound. Thereafter the procedure was repeated with the rolled sheets five times with a nip of 3 mm.

The compounds were vulcanized at 160° C.

The physical parameters of the composition of the vulcanizates are given in table 5. The vulcanizates according to the invention are able to replace diphenylguanidine.

TABLE 5

Characteristics of the vulcanizates.

| | Unit | V3 | E8 | V4 |
|---|---|---|---|---|
| Mooney viscosity ML 1 + 4 | MU | 86 | 72 | 70 |
| Scorch time $t_5$ | sec | 1210 | 2290 | 2640 |
| Scorch time $t_{35}$ | sec | 1750 | 2820 | 3570 |
| Vulcanisation time $t_{10}$ | sec | 130 | 210 | 290 |
| Vulcanisation time $t_{90}$ | sec | 1330 | 1320 | 1230 |
| Hardness Shore A | Sh. A | 64 | 61 | 62 |
| Elongation at break $\varepsilon_8$ | % | 450 | 500 | 490 |
| Tensile strength | MPa | 18.4 | 17.9 | 17.0 |
| Modulus σ at ε = 100% | MPa | 2.2 | 1.9 | 1.9 |
| Modulus σ at ε = 300% | MPa | 9.7 | 8.1 | 8.3 |
| Payne G' (0.5%) − G' (100%)[1] | kPa | 3400 | 2700 | 3100 |
| Rheo-$F_{max-min}$[2] | dNm | 16.2 | 16.1 | 16.5 |

[1] first run
[2] maximum minus minimum value of rheometer curve

Figure 1:
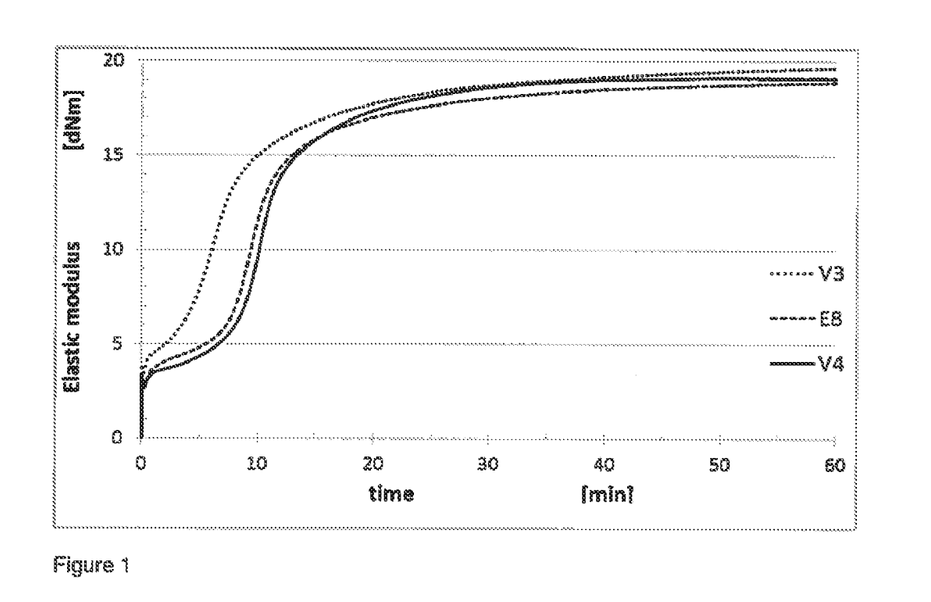
FIG. 1, FIG. 2, FIG. 3, FIG. 4, FIG. 5 and FIG. 6 graphically illustrate the results of curemetry testing in which Elastic moduls [dNm] is plotted over time [min] so as to demonstrate vulcanization behavior as determined with a rotor-less vuicarneter in accordance with DIN 53529, part 3.

The processing additive mixture E3 (according to the invention) used in E8 reduces the viscosity of the compound dramatically in comparison to V3, E8 (according to the invention) is able to replace diphenylguanidine (DPG) and AFLUX® 37 in the rubber mixture completely, FIG. 1 clearly shows that with 6 phr of ammonium salt AS 1 containing processing additive mixture E3 according to the invention it is possible to replace 3 phr Aflux® 37/2 phr DPG getting the same cure curve characteristics.

Example 5: Vulcanizates, Their Ingredients, and a Method for Producing Those

The vulcanizable mixtures comprise processing additive mixtures for replacing diphenylguanidine. In example 5 Si 69 is used as silane. The following components were used:

TABLE 6

Composition of the vulcanizates

| | V5 | E9 | E10 | E11 |
|---|---|---|---|---|
| BUNA CB 24 | 25 | 25 | 25 | 25 |
| BUNA VSL 5025-2 | 103.1 | 103.1 | 103.1 | 103.1 |
| Si 69 | 6.4 | 6.4 | 6.4 | 6.4 |
| Ultrasil GR 7000 | 80 | 80 | 80 | 80 |
| Zinc oxide WS | 2.5 | 2.5 | 2.5 | 2.5 |
| Stearic acid | 1.0 | 1.0 | 1.0 | 1.0 |
| AFLUX ® 37 | 3.0 | | | |
| E3[1] | | 3.0 | 3.0 | |
| E6[1] | | | | 3.0 |
| Vulkanox ® HS | 1.0 | 1.0 | 1.0 | 1.0 |
| Vulkanox ® 4020 | 1.0 | 1.0 | 1.0 | 1.0 |
| Antilux ® 654 | 1.0 | 1.0 | 1.0 | 1.0 |
| Vulcuren ® | | 0.3 | 0.4 | 0.3 |
| DPG | 2.0 | | | |
| TBBS | 1.7 | 1.7 | 1.7 | 1.7 |
| Sulphur milled | 1.4 | 1.4 | 1.4 | 1.4 |

Amounts in phr,
[1] containing ammonium salt

Production of Vulcanizates:

The vulcanizates E9 to E11 and V5 have been prepared as follows:

Mixing Step 1:

The Polymers Bursa CB 24 and Bursa VSL 5025-2 have been filled into an internal mixer (Filling degree: 72%; rotational speed: 70 rpm; 70° C.) and mixed for about 30 seconds. Further components, such as ZnO WS, processing additive mixtures E3, E6, Aflux® 37, antidegradants I and II, Vulcuren were mixed for about 30 seconds, followed by the addition of the remaining compounds such as ½ Ultrasil GR 7000 and ½ silane Si 69 and further mixing for about 60 seconds, followed by the addition of ½ Ultrasil GR 7000 and ½ silane Si 75 and further mixing for about 60 seconds.

This compound was then mixed for about 2 minutes. The expulsion took place at 150° C.-160° C.

The compound was put on a roller with a nip of 4 mm at 50° C. for approximately 45 sec. The compound was cut and again was transformed to a rolled sheet; the rolled sheet was put again on the roller immediately. The procedure was repeated altogether six times, whereat the compound was cut three times from the right side and three times from the left side in order to get a homogeneous compound. The sheets were stored for 24 hours at room temperature.

Mixing Step 2:

In the second mixing stage the batch of first step have been filled into an internal mixer (Filling degree: 69%; rotational speed: 70 rpm; 90° C.) and mixed for about 3 minutes, the so called "Nachzwicken". The expulsion took place at 150° C.-160° C. The compound was put on a roller with a nip of 4 mm for approximately 45 sec. The compound was cut and again was transformed to a rolled sheet; the rolled sheet was put again on the roller immediately. The procedure was repeated altogether six times, whereat the compound was cut three times from the right side and three times from the left side in order to get a homogeneous compound. The sheets were stored for 24 hours at room temperature.

Mixing Step 3:

In the third mixing stage the batch of second step has been filled into an internal mixer (Filling degree: 67%; rotational speed: 40 rpm; 50° C.) and mixed for about 30 seconds. Further additives, such as Sulphur, accelerators DPG. TBBS were added and mixed for about 90 seconds. The expulsion took place at 90° C.-110° C. The compound was put on a roller with a nip of 3-4 mm for approximately 20 sec. The compound was cut and again was transformed to a rolled sheet; the rolled sheet was put again on the roller immediately. The procedure was repeated altogether six times, whereat the compound was cut three times from the right side and three times from the left side in order to get a homogeneous compound. Thereafter the procedure was repeated with the rolled sheets five times with a nip of 3 mm.

The compounds were vulcanized at 160° C.

The results are summarized in table 7. The ammonium salt AS 1 containing processing additive mixture E3 and E6 as well as chemicals (Vulcuren® (anti-reversion agent)) were added in the first mixing step.

TABLE 7

Characteristics of the vulcanizates.

| | Unit | V5 | E9 | E10 | E11 |
|---|---|---|---|---|---|
| Mooney viscosity ML 1 + 4 | MU | 67 | 73 | 79 | 74 |
| Hardness Shore A | Sh. A | 65 | 65 | 65 | 65 |
| Elongation at break $\varepsilon_8$ | % | 390 | 410 | 370 | 390 |
| Tensile strength | MPa | 16.1 | 17.8 | 17.5 | 16.7 |
| Modulus σ at ε = 100% | MPa | 2.4 | 2.7 | 2.7 | 2.6 |
| Modulus σ at ε = 300% | MPa | 11.2 | 11.7 | 13.0 | 11.6 |
| Resistance to tearing | N/m | 20 | 25 | 21 | 25 |
| Abrasion (DIN 53516) | mm³ | 142 | 127 | 116 | 119 |
| Payne (G' (0.28%) − G' (150%))[1] | kPa | 4260 | 3640 | 3270 | 3580 |

[1] first run

The vulcanizable mixtures according to the invention E9-E11 achieved superior properties of the vulcanizate without the use of DPG and AFLUX® 37V5.

Figure 2:
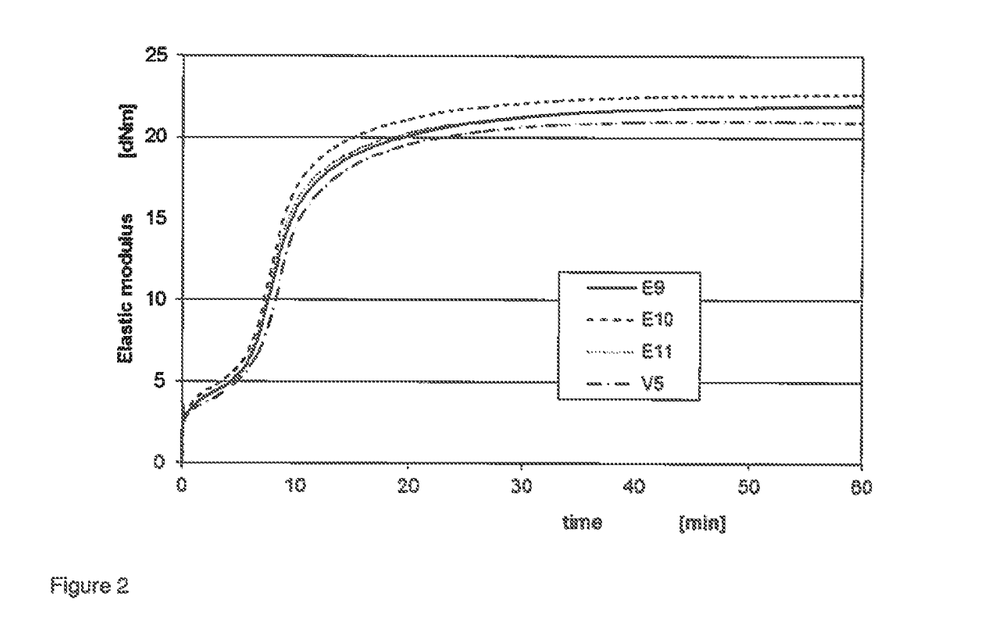

FIG. 2 clearly shows that with 3 phr of ammonium salt AS 1 containing processing additive mixture E3-E6 and a low amount of Vulcuren® according to the invention it is possible to replace 3 phr Aflux® 37/2 phr DPG getting the same curing characteristics.

With 3 phr of AS1 containing E3 as well as E6 and approximately 0.3 phr of a anti-reversion agent it is possible to achieve comparable or better properties as for a compound comprising 3 phr Aflux® 37 and 2 phr DPG with regard to hardness, elongation at break, tensile strength, moduli, resistance to tearing. Abrasion, Payne effect, and moduli can be improved, if it is necessary. FIG. 2 shows that 3 phr of ammonium salt containing processing additive mixtures E3 or E6 can replace 3 phr Aflux® 37/2 phr DPG and achieve the same cure characteristics.

Surprisingly the chemical (anti-reversion agent) can be added in the first mixing step as well as in the third mixing step as demonstrated in Example 8.

Increasing the amount of anti-reversion agent from 0.3 to 0.4 phr results mainly in a higher plateau of the MDR curve. The processing additive mixtures E3 and E6 have the same curve progression. It is obvious, that the use of 3 phr processing additive mixture according to the invention and less than 0.3 phr of Vulcuren® will surprisingly give the same curve progression as the use of 3 phr Aflux® 37 and 2 DPG (V5), In doing so the amount of additives can be surprisingly reduced from 5 phr to 3.3 phr.

Example 6: Replacement of DPG by an Acidic and a Neutral Processing Additive Mixture In example 6 an acidic (E7) and a neutral (E5) processing additive mixture is added in the first step of the three-step mixing procedure for the manufacture of the rubber compound in order to replace DPG respectively the combination of DPG and Aflux 37. Si 69 was used as a silane. The composition is summarized in Table 8.

TABLE 8

| Composition of ths vulcanizates | | | | |
|---|---|---|---|---|
| | V5 | V6 | E12 | E13 |
| BUNA CB 24 | 25 | 25 | 25 | 25 |
| BUNA VSL 5025-2 | 103.1 | 103.1 | 103.1 | 103.1 |
| Si 69 | 6.4 | 6.4 | 6.4 | 6.4 |
| Ultrasil GR 7000 | 80 | 80 | 80 | 80 |
| Zinc oxide WS | 2.5 | 2.5 | 2.5 | 2.5 |
| Stearic acid | 1.0 | 1.0 | 1.0 | 1.0 |
| AFLUX ® 37 | 3.0 | | | |
| Vulkanox ® HS | 1.0 | 1.0 | 1.0 | 1.0 |
| Vulkanox ® 4020 | 1.0 | 1.0 | 1.0 | 1.0 |
| Antilux ® 654 | 1.0 | 1.0 | 1.0 | 1.0 |
| E5 | | | 4 | |
| E7 | | | | 4 |
| DPG | 2.0 | 2.0 | | |
| TBBS | 1.7 | 1.7 | 1.7 | 1.7 |
| Sulphur milled | 1.4 | 1.4 | 1.4 | 1.4 |

Amounts in phr

In table 9 the results after vulcanization are summarized.

TABLE 9

| Characteristics of the vulcanizates | | | | |
|---|---|---|---|---|
| | Unit | V5 | V6 | E12 | E13 |
| ML 1 + 4[1)] 100° C.; 1. step | MU | 108 | 117 | 112 | 104 |
| ML 1 + 4[1)] 100° C.; 2. step | MU | 83 | 95 | 85 | 84 |

TABLE 9-continued

| Characteristics of the vulcanizates | | | | |
|---|---|---|---|---|
| | Unit | V5 | V6 | E12 | E13 |
| ML 1 + 4[1)] 100° C.; 3. step | MU | 73 | 82 | 76 | 75 |
| Scorch time $t_5$ | Sec | 2077 | 1556 | 2372 | 2153 |
| Vulc. time t52) | Sec | 48 | 37 | 51 | 57 |
| Vulc. time t902) | Sec | 1145 | 1182 | 1343 | 1164 |
| Hardness Shore A (60° C.) | Sh. A | 63 | 66 | 65 | 65 |
| Elasticity (60° C.) | % | 54 | 51 | 54 | 55 |
| Elongation $\varepsilon_8$ [3)] | % | 399 | 361 | 403 | 397 |
| Tensile strength | MPa | 16.1 | 17.0 | 16.8 | 16.0 |
| Modulus $\sigma$[4)] at $\varepsilon$ = 100% | MPa | 2.5 | 2.8 | 2.6 | 2.5 |
| Modulus $\sigma$[4)] at $\varepsilon$ = 300% | MPa | 10.8 | 13.0 | 11.0 | 10.9 |
| $F_{max} - F_{min}$[5)] | dNm | 18 | 18.7 | 19.1 | 18.8 |
| Payne[6)] (G' (0.28%) – G' (100%)) | kPa | 1950 | 2000 | 1835 | 1675 |
| abrasion | mg | 133 | 129 | 122 | 127 |

[1)]Mooney viscosity
[2)]Vulcanization times $t_5$ and $t_{90}$
[3)] Elongation at break $\varepsilon_8$
[4)]Modulus $\sigma$
[5)]torque difference (MDR)
[6)]G' (0.28%) – G' (100%), second run By the use of the processing additive mixtures E5 and E7 comparable or better viscosities are reached in all three mixing steps in comparison to V5 or V6. The vulcanizable mixtures according to the invention E12-E13 achieved superior properties of the vulcanizate without the use of diphenylguanidine (DPG) and AFLUX® 37.

With 4 phr of AS1 containing E5 as well as E7 it is possible to achieve comparable or better properties as for a compound comprising 3 phr Aflux® 37 and 2 phr DPG with regard to scorch time $t_5$, vulcanization time $t_5$, vulcanization time $t_{90}$, hardness, elasticity, elongation at break, tensile strength, moduli, torque $F_{max}$–$F_{min}$. Hardness, torque, abrasion, and Payne effect can be improved, if it is necessary. Surprisingly, the hardness can be kept on the level of the pure DPG (V6) nevertheless using the processing additive mixtures E5 or E7. The lower Payne effects of E12 and E13 clearly show, that the replacement of DPG leads to a lower filler-filler interaction by the use of the new processing additive mixtures E12 and E13, which is favourable with regard to the rolling resistance of tires.

Figure 3:
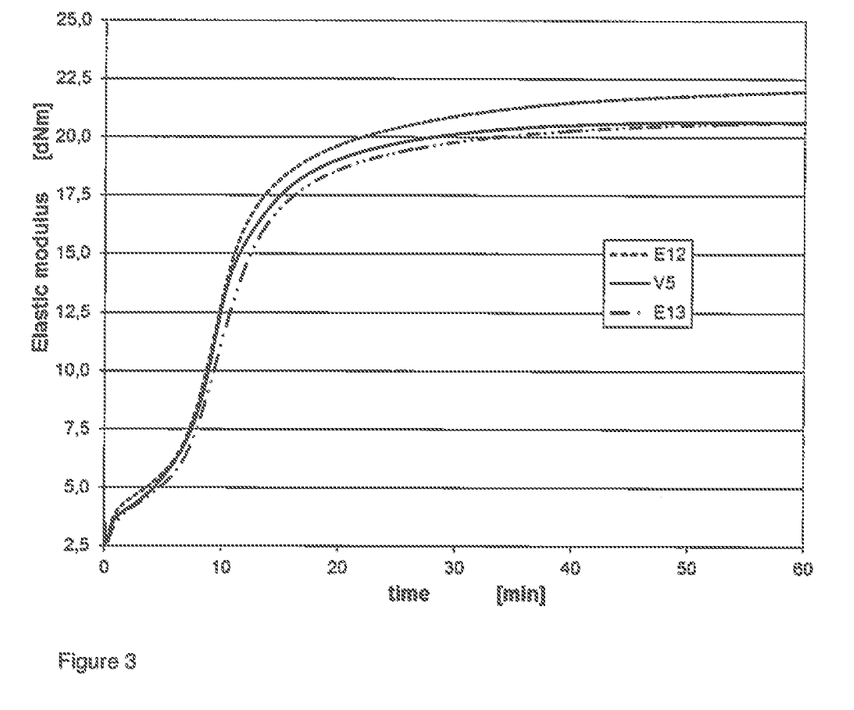
Figure 4:
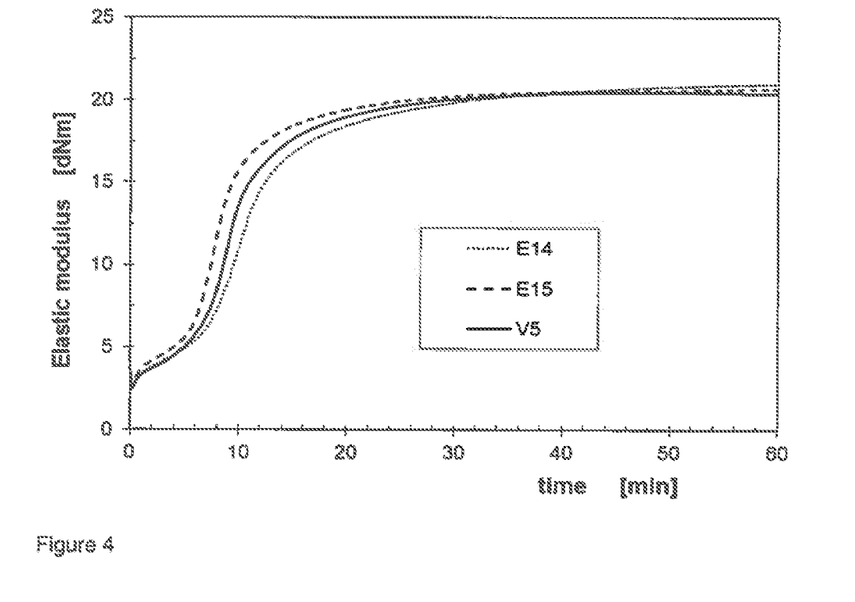

It can clearly be seen from FIG. 3 that 4 phr of ammonium salt containing processing additive mixtures E5 (E12) or E7 (E13) is able to replace 3 phr Aflux® 37/2 phr DPG getting the same cure characteristics. The amount of additives can surprisingly be reduced from 5 phr to 4 phr in doing so.

Example 7: Influence of Accelerator on the Characteristics of the Vulcanizates In example 7 an accelerator is added instead of the anti-reversion agent Vulcuren® in the first step of the three-step mixing process for the manufacture of the rubber compound. Si 69 is again used as a sane and zinc dibenzyldithiocarbamate (ZBEC) as accelerator. The composition is summarized in table 10. E3 and the chemical (accelerator) are added in the first mixing step.

TABLE 10

| | V5 | E14 | E15 |
|---|---|---|---|
| BUNA CB 24 | 25 | 25 | 25 |
| BUNA VSL 5025-2 | 103.1 | 103.1 | 103.1 |
| Si 69 | 6.4 | 6.4 | 6.4 |
| Ultrasil GR 7000 | 80 | 80 | 80 |

TABLE 10-continued

|  | V5 | E14 | E15 |
|---|---|---|---|
| Zinc oxide WS | 2.5 | 2.5 | 2.5 |
| Stearic add | 1.0 | 1.0 | 1.0 |
| AFLUX ® 37 | 3.0 |  |  |
| E3 |  | 3.0 | 3.0 |
| Vulkanox ® HS | 1.0 | 1.0 | 1.0 |
| Vulkanox ® 4020 | 1.0 | 1.0 | 1.0 |
| Antilux ® 654 | 1.0 | 1.0 | 1.0 |
| Accelerator |  | 0.1 | 0.2 |
| DPG | 2.0 |  |  |
| TBBS | 1.7 | 1.7 | 1.7 |
| Sulphur milled | 1.4 | 1.4 | 1.4 |

Amounts in phr

In table 11 the results after vulcanization are summarized.

TABLE 11

|  | Unit | V5 | E14 | E15 |
|---|---|---|---|---|
| Mooney viscosity ML 1 + 4 | MU | 67 | 72 | 73 |
| Hardness Shore A | Sh. A | 65 | 65 | 65 |
| Elongation at break $\varepsilon_8$ | % | 380 | 450 | 410 |
| Tensile strength | MPa | 15.9 | 18.1 | 17.7 |
| Modulus $\sigma$ at $\varepsilon$ = 100% | MPa | 2.5 | 2.3 | 2.5 |
| Modulus $\sigma$ at $\varepsilon$ = 300% | MPa | 11.7 | 10.4 | 12.2 |
| Payne (G' (0.28%) − G' (100%))[1] | kPa | 4500 | 3950 | 3450 |

[1] first run

Table 11 shows, that it is possible to adjust the mechanical properties (3 phr Aflux® 37/2 phr DPG) by selecting a ZBEC concentration between 0.1 and 0.2 phr. By doing so, the dosage of E3/accelerator is lower than of Aflux® 37/DPG (V5). Adding 3 phr of AS1 containing E3 in combination with a low amount of ZBEC in the first mixing step, it is surprisingly possible to achieve comparable or better properties as for a compound comprising 3 phr Aflux® 37 and 2 phr DPG. Elongation at break, tensile strength, and Payne effect can be improved, if it is necessary. From FIG. 4 can clearly be deduced, that 3 phr of AS1 containing E3 and approximately 0.1 phr~0.2 phr of accelerator ZBEC can replace 3 phr Aflux® 37/2 phr DPG (V5) while having the same curing characteristics. Surprisingly the additive (D) can be added in the first mixing step (also incorporated in the processing additive mixture) as well as in the third mixing step (Example 8). Aflux® 37/DPG (V5) can be replaced completely by E3 accelerator.

Example 8: Comparison of Additive (D) Dosage in Different Mixing Steps and Comparison of the Different Ways of Adding the Additive D In example 8 the anti-reversion agent Vulcuren® is added together with E3 in the first mixing step (E16), whereat in E17 the processing additive mixture E3 is added in the first mixing step and Vulcuren® is dosed in the third mixing step. The separate dosages of Vulcuren® are compared to the addition of the processing additive mixture E5 in the first mixing step (E12), which contains E3 as well as Vulcuren®. This is advantageous, because only one addition of additive is sufficient. Si 69 is again the silane. The composition is given in table 12.

TABLE 12

Composition of the vulcanizates.

|  | V5 | E12 | E16 | E17 |
|---|---|---|---|---|
| BUNA CB 24 | 25 | 25 | 25 | 25 |
| BUNA VSL 5025-2 | 103.1 | 103.1 | 103.1 | 103.1 |
| Si 69 | 6.4 | 6.4 | 6.4 | 6.4 |
| Ultrasil GR 7000 | 80 | 80 | 80 | 80 |
| Zinc oxide WS | 2.5 | 2.5 | 2.5 | 2.5 |
| Stearic acid | 1.0 | 1.0 | 1.0 | 1.0 |
| AFLUX ® 37 | 3.0 |  |  |  |
| Vulkanox ® HS | 1.0 | 1.0 | 1.0 | 1.0 |
| Vulkanox ® 4020 | 1.0 | 1.0 | 1.0 | 1.0 |
| Antilux ® 654 | 1.0 | 1.0 | 1.0 | 1.0 |
| E5 |  | 4 |  |  |
| E3 |  |  | 3.75 | 3.75 |
| Vulcuren ® |  |  | 0.25[1] | 0.25[2] |
| DPG | 2.0 |  |  |  |
| TBBS | 1.7 | 1.7 | 1.7 | 1.7 |
| Sulphur milled | 1.4 | 1.4 | 1.4 | 1.4 |

Amounts in phr,
[1] first step
[2] third step

In table 13 the results after vulcanization are summarized.

TABLE 13

Characteristics of the vulcanizates.

|  | Unit | V5 | E12 | E16 | E17 |
|---|---|---|---|---|---|
| ML 1 + 4[1] 100° C.; 1. step | MU | 108 | 112 | 102 | 106 |
| ML 1 + 4[1] 100° C.; 2. step | MU | 83 | 85 | 85 | 83 |
| ML 1 + 4[1] 100° C.; 3. step | MU | 73 | 76 | 76 | 74 |
| Scorch time $t_5$ | Sec | 2077 | 2372 | 2097 | 2721 |
| Vulc. time $t_5$[2] | Sec | 48 | 51 | 56 | 55 |
| Vulc. time $t_{90}$[2] | Sec | 1145 | 1343 | 1164 | 1174 |
| Hardness Shore A (60° C.) | Sh. A | 63 | 65 | 64 | 64 |
| Elasticity (60° C.) | % | 54 | 54 | 55 | 54 |
| Elongation $\varepsilon_8$[3] | % | 399 | 403 | 404 | 379 |
| Tensile strength | MPa | 16.1 | 16.8 | 16.6 | 15.9 |
| Modulus $\sigma$[4] at $\varepsilon$ = 100% | MPa | 2.5 | 2.6 | 2.6 | 2.6 |
| Modulus $\sigma$[4] at $\varepsilon$ = 300% | MPa | 10.8 | 11.0 | 11.1 | 11.4 |
| $F_{max} - F_{min}$[5] | dNm | 18 | 19.1 | 18.8 | 19.5 |
| Payne[6] (G' (0.28%) − G' (100%)) | kPa | 1950 | 1835 | 1855 | 1905 |
| Abrasion | mg | 133 | 122 | 125 | 129 |

Figure 5:
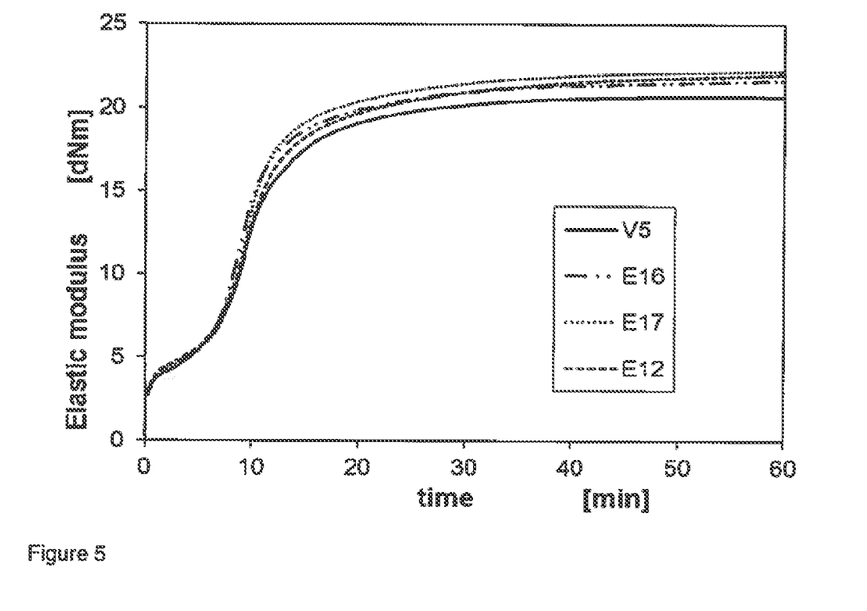

[1] Mooney viscosity
[2] Vulcanization times $t_5$ and $t_{90}$
[3] Elongation at break $\varepsilon_8$
[4] Modulus $\sigma$
[5] maximum − minimum torque (MDR)
[6] G' (0.28%) − G' (100%), second run FIG. 5 clearly shows that it is possible to get the same vulcanization curves by adding E16 and E17, i.e. for adding Vulcuren® in the first and third mixing step. Comparing these curves of E16 and E17 with the vulcanization curve of E12, it is obviously, that Vulcuren® can be added to the processing additive mixture, i.e. the production of the Vulcuren® containing processing additive mixtures E12 was successfully and E12 was added successfully in the first mixing step resulting in comparable results.

Table 13 gives evidence that the dosage of Vulcuren® in the first and third mixing step results in the same properties of the vulcanisates. Only the scorch time $t_5$ is higher for adding Vulcuren® in the third mixing step. Also the usage of the Vulcuren® containing processing additive mixture E12 in the first mixing step gives the same or better results in comparison to separately dosing Vulcuren® in the first or in the third mixing step.

Also Table 13 clearly shows that E12, E16, and E17 result in comparable or better properties in comparison with DPG/

Aflux 37 (V5). Especially scorch time t₅, vulcanization time t₅, torque $F_{max}-F_{min}$, abrasion, and Payne effect can surprisingly be improved.

Example 9: Total Replacement of DPG by a Processing Additive Mixture

In example 9 the anti-reversion agent Vulcuren® containing E5 and E18 are added in the first mixing step in order to replace DPG/Aflux 37 (V5). Si 69 is used as the silane. The composition is given in table 14.

TABLE 14

| Composition of the vulcanizates | | | |
|---|---|---|---|
| | V5 | E12 | E19 |
| BUNA CB 24 | 25 | 25 | 25 |
| BUNA VSL 5025-2 | 103.1 | 103.1 | 103.1 |
| Si 69 | 6.4 | 6.4 | 6.4 |
| Ultrasil GR 7000 | 80 | 80 | 80 |
| Zinc oxide WS | 2.5 | 2.5 | 2.5 |
| Stearic acid | 1.0 | 1.0 | 1.0 |
| AFLUX ® 37 | 3.0 | | |
| Vulkanox ® HS | 1.0 | 1.0 | 1.0 |
| Vulkanox ® 4020 | 1.0 | 1.0 | 1.0 |
| Antilux ® 654 | 1.0 | 1.0 | 1.0 |
| E5 | | 4¹⁾ | |
| E18 | | | 4¹⁾ |
| DPG | 2.0 | | |
| TBBS | 1.7 | 1.7 | 1.7 |
| Sulphur milled | 1.4 | 1.4 | 1.4 |

Amounts in phr,
¹⁾first mixing step

In table 15 the results after vulcanization are summarized.

TABLE 15

| Characteristics of the vulcanizates | | | | |
|---|---|---|---|---|
| | Unit | V5 | E12 | E19 |
| ML 1 + 4¹⁾ 100° C.; 1. step | MU | 108 | 112 | 104 |
| ML 1 + 4¹⁾ 100° C.; 2. step | MU | 83 | 85 | 84 |
| ML 1 + 4¹⁾ 100° C.; 3. step | MU | 73 | 76 | 75 |
| Scorch time t₅ | Sec | 2077 | 2372 | 2153 |
| Vulc. time t₅²⁾ | Sec | 48 | 51 | 57 |
| Vulc. time t₉₀²⁾ | Sec | 1145 | 1343 | 1164 |
| Hardness Shore A (60° C.) | Sh. A | 63 | 65 | 65 |
| Elasticity (60° C.) | % | 54 | 54 | 55 |
| Elongation ε₈³⁾ | % | 399 | 403 | 397 |
| Tensile strength | MPa | 16.1 | 16.8 | 16.0 |
| Modulus σ⁴⁾ at ε = 100% | MPa | 2.5 | 2.6 | 2.5 |
| Modulus σ⁴⁾ at ε = 300% | MPa | 10.8 | 11.0 | 10.9 |
| $F_{max} - F_{min}$⁵⁾ | dNm | 18 | 19.1 | 18.8 |
| Payne⁶⁾ (G' (0.28%) – G' (100%)) | kPa | 1950 | 1835 | 1860 |
| Abrasion | Mg | 133 | 122 | 127 |

Figure 6:
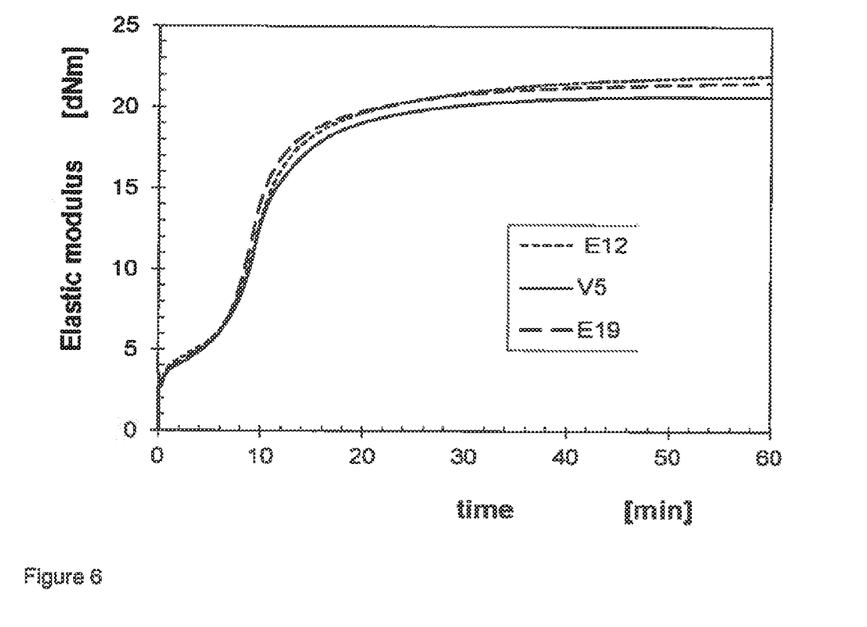

¹⁾Mooney viscosity
²⁾Vulcanization times t₅ and t₉₀
³⁾Elongation at break ε₈
⁴⁾Modulus σ
⁵⁾maximum torque – minimum torque (MDR)
⁶⁾G' (0.28%) – G' (100%), second run FIG. 6 clearly shows that it is possible to get the identical vulcanization curve by adding 4 phr E18 in the first mixing step (E19) instead of 2 phr DPG/3 phr Aflux 37 (V5) to the compound; only the level of E19 is a little higher than the level of V5, what can be adapted by a little lower amount of E18. Comparing the curve of E12 and E19 with the vulcanization curve of V5, it can be seen, that the E18 stabilized by an anti-aging agent (Vulkanox® BHT) improves the curve progression of E19 compared to the curve of E12 (unstabilized E5).

Table 15 gives evidence that the dosage of the stabilized E18 (E19) in the first mixing step results in the same or better properties of the vulcanisates in comparison to 2 phr DPG/3 phr Aflux 37 (V5). Especially scorch time t₅, vulcanization time t₅, torque $F_{max}-F_{min}$, hardness, abrasion, and Payne effect can surprisingly be improved.

In table 16 the loss factor of the compounds after vulcanization measured by dynamic mechanical thermal analysis (DMTA) are summarized.

TABLE 16

| Loss factor tan δ of the vulcanizates at –10° C., 10° C., and 60° C. | | | |
|---|---|---|---|
| | –10° C. | 10° C. | 60° C. |
| E19 | 0.29 | 0.15 | 0.076 |
| E12 | 0.26 | 0.15 | 0.078 |
| V5 | 0.28 | 0.14 | 0.082 |
| V6 | 0.21 | 0.14 | 0.085 |

Table 16 shows that the loss factor of E19 and E12 are improved with regard to wet skid resistance (tan δ at 10° C.) and rolling resistance (tan δ at 60° C.) of tires. The results above show surprisingly that DPG and Aflux 37 can be completely replaced by E18.

The use of the Vulcuren® containing E18 instead of 2 phr DPG/3 phr Aflux 37 is advantageous, because only one raw material instead of two can to be used and E 18 can be added in the first mixing step and lowers immediately the compound viscosity.

E 18 is an environmental friendly processing additive mixture Compared to DPG. The Payne effect, abrasion, rolling resistance a well as wet skid resistance of tires are improved by the multifunctional processing additive mixture E18.

What is claimed is:

1. A processing additive mixture comprising:
(A) 50 wt. to % 70 wt.-% of one or more compounds selected from the group of polyols, amides and carboxylic acids, and
(B) 20 wt. to % 40 wt.-% of at least one ammonium salt according to the formula (I)

$$Y\text{-}(T\text{-}X)_m\text{-}Z_w \qquad (I)$$

wherein
m=1 and w=0 or m=0 and w=1,
T is selected from a straight or branched, unsubstituted or substituted C₂-C₂₂ aliphatic moiety, unsubstituted or substituted C₅-C₂₂ aromatic moiety, unsubstituted or substituted C₄-C₂₂ alicyclic moiety; unsubstituted or substituted C₅-C₂₂ aromatic heterocyclic moiety,
X and Y are wherein
R¹, R², R³, R⁵ and Z are, independently of each other, hydrogen or a linear or branched C₁₂-C₂₈ alkyl, and
R⁴ is a linear or branched C₁₂-C₂₈ alkyl, and
(C) 3 wt.-% to 10 wt.-% of one or more auxiliaries for crystallization, wherein the sum of (A), (B) and (C) is defined as 100 wt.-% and optionally wherein the processing additive mixture is in solid form.

2. The processing additive mixture according to claim 1, wherein the component (A) comprises at least one polyol.

3. The processing additive mixture according to claim 1, wherein:
T is selected from an unsubstituted or substituted $C_2$-$C_{22}$ aliphatic moiety;
$R^1$, $R^2$, $R^3$, $R^5$ and Z are independently of each other hydrogen and stearyl, and
$R^4$ is stearyl; and
the mixture has a solid form with a melting point of >30° C.

4. The processing additive mixture according to claim 1, wherein the ammonium salt (B) according to formula (I) is selected from the group of (Ia)

(Ib)

(Ic)

wherein
r is a number from 2 to 22,
$R^1$, $R^2$, $R^3$, $R^5$, and Z are, independently from each other, hydrogen or a linear or branched $C_{12}$-$C_{28}$ alkyl, and
each $R^4$ is independently $C_{12}$-$C_{28}$ alkyl.

5. The processing additive mixture according to claim 1, additionally comprising the one or more further additives (D), wherein the total amount of further additives (D) is 0.1 wt.-% to 20 wt.-% based on the sum of (A), (B) and (C).

6. The processing additive mixture according to claim 1, additionally comprising the one or more further additives (E), wherein the total amount of the additive(s) (E) is 0.05 wt.-% to 10 wt.-% based on the sum of (A), (B) and (C).

7. The processing additive mixture according to claim 1, wherein the one or more auxiliaries for crystallization (C) is selected from the group of silica, aluminosilicates, talcum, calcium fluoride, magnesium oxide, calcium oxide, zinc oxide, pigments, zinc stearate, calcium stearate, magnesium stearate, potassium stearate, sodium stearate or aluminum stearate, aluminum hydroxyl-bis(4-t-butylbenzoate), benzoic acid, dibenzylidene sorbitol, bis (p-methyldibenzylidene) sorbitol, and
wherein the processing additive mixture further comprises:
one or more compounds (D) selected from the group of anti-reversion agents, accelerators, activators or vulcanization agents, and
one or more compounds (E) selected from the group of anti-aging agents, antioxidants and antidegradants.

8. The processing additive mixture according to claim 1, wherein:
the component (A) comprises at least one polyol;
the ammonium salt (B) according to formula (I) is selected from the group of (Ia)

(Ib)

(Ic)

wherein
r is a number from 2 to 22,
$R^1$, $R^2$, $R^3$, $R^5$, and Z are, independently from each other, hydrogen or a linear or branched $C_{12}$-$C_{28}$ alkyl, and
each $R^4$ is independently $C_{12}$-$C_{28}$ alkyl.

9. The processing additive mixture according to claim 8, wherein:
$R^1$, $R^2$, $R^3$, $R^4$, $R^5$, and Z are stearyl, and
the mixture has a solid form with a melting point >50° C.

10. The processing additive mixture according to claim 9, further comprising:
5 wt.-% to 10 wt.-%, based on the sum of (A), (B) and (C), of one or more compounds (D) selected from the group of anti-reversion agents, accelerators, activators or vulcanization agents; and
0.05 wt.-% to 10 wt.-%, based on the sum of (A), (B) and (C), of one or more compounds (E) selected from the group of anti-aging agents, antioxidants and antidegradants.

11. A process for preparing the processing additive mixture according to claim 1, the process comprising:
mixing the one or more compounds (A), the one or more ammonium salts (B) according to chemical formula (I), and the one or more auxiliaries for crystallization (C) at temperatures from 50 to 150° C. to form a liquid mixture; and
cooling down the liquid mixture for solidification.

12. The process according to claim 11, wherein the solidification comprises dropping the liquid mixture onto a cooled belt having a temperature from −20 to 25° C.

13. The process according to claim 11, further comprising mixing the one or more compounds (A) and the one or more ammonium salts (B) with at least one further additive selected from:
one or more compounds (D) selected from the group of anti-reversion agents, accelerators, activators or vulcanization agents; and
one or more compounds (E) selected from the group of anti-aging agents, antioxidants and antidegradants, and
wherein the one or more auxiliaries for crystallization (C) is selected from the group consisting of silica, aluminosilicates, talcum, calcium fluoride, magnesium oxide, calcium oxide, zinc oxide, pigments, zinc stearate, calcium stearate, magnesium stearate, potassium stearate, sodium stearate, aluminum stearate, aluminum hydroxyl-bis(4-t-butylbenzoate), benzoic acid, dibenzylidene sorbitol, and bis (p-methyl-dibenzylidene sorbitol.

14. The process according to claim 13, wherein the components are mixed at a temperature of 80 to 110° C.; and the solidification comprises dropping the liquid mixture onto a cooled belt having a temperature of 3 to 18° C.

15. A vulcanizate comprising the processing additive mixtures according to claim 1.

* * * * *